US006888963B2

(12) United States Patent
Nichogi

(10) Patent No.: US 6,888,963 B2
(45) Date of Patent: May 3, 2005

(54) IMAGE PROCESSING APPARATUS AND IMAGE PROCESSING METHOD

(75) Inventor: Mutsuko Nichogi, Fuchu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 645 days.

(21) Appl. No.: 09/905,920

(22) Filed: Jul. 17, 2001

(65) Prior Publication Data

US 2002/0054237 A1 May 9, 2002

(30) Foreign Application Priority Data

Jul. 18, 2000 (JP) .................................... 2000-216947
Dec. 28, 2000 (JP) .................................... 2000-400401

(51) Int. Cl.$^7$ ................................................ G06K 9/00
(52) U.S. Cl. ..................... 382/167; 382/165; 382/156; 358/518; 358/504
(58) Field of Search ........................ 382/162, 164–165, 382/167–172, 156; 358/520, 1.9, 518, 504, 474, 523, 406; 345/604, 589, 581, 591, 592–593; 348/207, 222, 223, 225, 228, 234, 235–236

(56) References Cited

U.S. PATENT DOCUMENTS

| 5,929,906 | A | * | 7/1999 | Arai et al. ................ 348/223.1 |
| 6,469,706 | B1 | * | 10/2002 | Syeda-Mahmood ......... 345/589 |
| 6,654,150 | B1 | * | 11/2003 | Rozzi .......................... 358/520 |
| 2001/0009438 | A1 | * | 7/2001 | Kihara et al. ................ 348/223 |
| 2002/0085751 | A1 | * | 7/2002 | Matsushiro et al. ........ 382/162 |
| 2003/0016862 | A1 | * | 1/2003 | Ohga .......................... 382/162 |

FOREIGN PATENT DOCUMENTS

| JP | 07-174631 | 7/1995 |
| JP | 09-233490 | 9/1997 |
| JP | 11-085952 | 3/1999 |

OTHER PUBLICATIONS

Laurence T. Maloney, "Evaluation Of Linear Models Of Surface Spectral Reflectance With Small Numbers of Parameters," Journal of Optical Society of America, vol. 3, No. 10, Oct. 1986, pp. 1673–1683.

Michael J. Vrhel, Ron Gershon, and Lawrence S. Iwan, "Measurement and Analysis Of Object Reflectance Spectra," Color Research and Application, vol. 19, No. 1. Feb. 1994, pp. 4–1.

* cited by examiner

Primary Examiner—Kanjibhai Patel
Assistant Examiner—Ali Bayat
(74) Attorney, Agent, or Firm—McDermott Will & Emery LLP

(57) ABSTRACT

There is disclosed a method for converting color image data inputted from an image input apparatus to a color space which is not dependent on the apparatus and/or lighting with a high precision, the method comprising: setting a plurality of sets of a subject as a main constituting element of an image inputted from the image input apparatus, means for estimating color data which is not dependent on the apparatus and/or the lighting for each set, judging whether or not each pixel of the image data inputted from the image input apparatus belongs to the set of the subject, and selecting the estimating means based on a judgment result to estimate the color data which is not dependent on the apparatus and/or the lighting; learning a distribution of a specified object for each set in the color space after color conversion during color conversion of the image, performing tentative color conversion from an input image signal, and using the signal after the tentative color conversion to judge the set to which each pixel belongs in the color space after the color conversion; or judging/indicating the set by a user, and subjecting each judged set to a different color conversion processing.

33 Claims, 32 Drawing Sheets

IMAGE PROCESSING APPARATUS AND IMAGE PROCESSING METHOD

BACKGROUND OF THE INVENTION

1. Field of the Invention

The present invention relates to an image processing apparatus and image processing method for converting color image data inputted from an image input apparatus to color space which is not dependent on the apparatus and/or lighting with a high precision.

2. Prior Art

In recent years, a scanner, digital camera, printer, display, and other various apparatuses have been utilized as an apparatus for processing a color image. As a technique for changing image data among these apparatuses, there is a technique comprising once converting color image data inputted from an input apparatus to an independent color space which is not dependent on the apparatus, and converting the space to the color image data to be outputted to an output apparatus. When conversion of a signal of the image input apparatus and the color space not dependent on the apparatus is established in this manner, the data can be transferred to any image output apparatus, and therefore it is unnecessary to set the same number of color converting processings as the number of combinations of the input apparatus and output apparatus. Moreover, when the color image data inputted from the image input apparatus is converted to the independent color space not dependent on not only the apparatus but also lighting, an image under lighting different from lighting of a time of image input can also be outputted via the output apparatus.

It is general to use XYZ three stimulus values defined by International Standardization Organization CIE, L*a*b* color specification system, L*u*v* color specification system, CAM 97s or another color appearance model as the independent color space which is not dependent on the apparatus. An attribute value of the color appearance model is calculated from the XYZ three stimulus values. Therefore, when the XYZ three stimulus values can be estimated from the signal of the image input/output apparatus, the color conversion is possible. Moreover, it is general to use spectral reflectance of a subject as the color space which is not dependent on the apparatus and lighting. When the spectral reflectance is integrated with desired lighting, the XYZ three stimulus values can be calculated. To estimate the XYZ three stimulus values or the spectral reflectance of the subject (object) from the color space of each image input/output apparatus is called characterization. The present invention relates to the characterization of the image input apparatuses such as a digital camera, multi-spectral camera, and scanner.

Examples of a conventional characterization technique of the image input apparatus include a method of measuring color of skin and method of estimating reflection spectrum described in Japanese Patent Application Laid-Open No. 174631/1995, a color reproduction apparatus described in Japanese Patent Application Laid-Open No. 85952/1999, and a color simulation apparatus described in Japanese Patent Application Laid-Open No. 233490/1997.

In the Japanese Patent Application Laid-Open No. 174631/1995, a method of estimating the reflection spectrum of the skin from the image inputted from the image input apparatus is disclosed. The procedure will be described with reference to FIG. 31. First, image data RGB inputted in procedure 3101 is converted to a signal linear to luminance with a secondary function. The secondary function described in the publication is represented by equation 1. The equation 1 is determined such that the XYZ three stimulus values of a nine-gradations color chip of an achromatic color are measured and the signal becomes linear to Y value as luminance.

$$\begin{cases} R' = -1.773 + 0.1369R + 0.0006568R^2 \\ G' = -0.1946 + 0.09309G + 0.0008552G^2 \\ B' = -0.2366 + 0.07422B + 0.001001B^2 \end{cases} \quad (1)$$

Subsequently, in procedure 3102, the XYZ three stimulus values are calculated from the luminance linear signal by a multiple regression matrix which is used up to at least a secondary term. Finally in procedure 3103, the spectral reflectance is estimated from the XYZ three stimulus values. The multiple regression matrix in the procedure 3102 needs to be predetermined. In order to determine the multiple regression matrix, skin is first photographed as a specific subject by the image input apparatus to obtain image data, and further skin color is measured with a colorimeter to obtain the XYZ three stimulus values. Subsequently, a matrix M for converting the image data to the XYZ three stimulus values is determined such that an error between the XYZ three stimulus values estimated by conversion and the XYZ three stimulus values measured by the calorimeter is minimized. To determine the estimating matrix in such a manner that the error between a predicted value and an actual measurement is minimized is referred to as multiple regression analysis and the estimating matrix determined in this manner is referred to as the multiple regression matrix. Assuming that a XYZ three stimulus values vector is T and image data vector is I, the multiple regression matrix is represented by equation 2. In the equation 2, $R_{TI}$ denotes a correlation matrix of T and I.

$$M = R_{TI} R_{II}^{-1} \quad (2)$$

Moreover, a dimension of the spectral reflectance in the procedure 3103 is as extremely large as 31 dimensions, and is difficult to estimate, even when a range of a visible light, for example, of 400 nm to 700 nm is sampled every 10 nm. Therefore, a method of performing a principal component analysis and representing a base having m-dimensions lower than 31-dimensions is used. Since a cumulative contribution ratio of a third principal component of the spectral reflectance of the skin as the subject is 99.5%, m=3 is sufficient, and a coefficient of the base can uniquely be obtained from the XYZ three stimulus values. In the aforementioned conventional characterization method, the subject is limited to the skin, and the matrix for estimating the XYZ three stimulus values from the image data is determined by the multiple regression analysis of the image data of the skin and the actually measured XYZ three stimulus values. Therefore, the XYZ three stimulus values of the skin can highly precisely be estimated in the matrix, but the XYZ three stimulus values of a subject other than the skin has an extremely large error.

Furthermore, in the color reproduction apparatus described in Japanese Patent Application Laid-Open No. 85952/1999, the matrix for obtaining the XYZ three stimulus values from the image data is derived as follows. First, the three stimulus values vector T and image data vector I can be represented by equation 3.

$$\begin{cases} T = E_0 X f \\ I = E_m S f \end{cases} \quad (3)$$

In the equation 3, $E_0$ denotes a lighting matrix during observation, X denotes a matrix using a color matching function as a lateral vector, f denotes a spectral reflectance, $E_m$ denotes a lighting matrix during photographing, and S denotes a matrix using a spectral sensitivity of the image input apparatus as the lateral vector. When the equation 3 is assigned to the multiple regression matrix (equation 2), equation 4 is obtained. In the equation 4, $R_{ff}$ is a correlation matrix of the spectral reflectance of the subject. The correlation matrix of the spectral reflectance of the subject as a main constituting element of the input image is calculated beforehand, and assigned to Rff of equation 4, so that a matrix (equation 4) for estimating the XYZ three stimulus values from the image data can be obtained.

$$M = E_0 X R_{ff} E_m S (E_m S R_{ff} E_m S)^{-1} \quad (4)$$

As described above, in the characterization method of the image input apparatus, the subject is limited, and the correlation matrix of the spectral reflectance of the limited subject is used to determine the matrix for estimating the XYZ three stimulus values from the image data. Therefore, when the XYZ three stimulus values of the image data of the subject other than the limited subject are estimated by the matrix, the error becomes extremely large.

Moreover, in the color simulation apparatus described in the Japanese Patent Application Laid-Open No. 233490/1997, lighting simulation is disclosed in which the image inputted from the image input apparatus is converted to a color under a desired light source, and then outputted onto a display. The procedure will be described with reference to FIG. 32. Similarly as the method described in the Japanese Patent Application Laid-Open No. 174631/1995, the principal component of the spectral reflectance is analyzed, and the reflectance is represented by the base having the m-dimensions lower than 31 dimensions. Subsequently, in procedure 3201, a base coefficient m-dimensional vector is estimated from the input image data by a neural network.

Next in procedure 3202, the spectral reflectance is calculated from the estimated m-dimensional vector. A desired light source vector is applied to the obtained spectral reflectance to obtain the XYZ three stimulus values, and a color property of a display is used to convert the values to a display drive signal. In the neural network, when the input data has a property similar to that of learning data, an appropriate spectral reflectance is estimated, but the error becomes extremely large with the input data which is not similar to the learning data. Therefore, this conventional example using the neural network can be said to be a method for enabling the estimate, only when the subject is limited. Any one of the aforementioned conventional methods comprises limiting the subject to one, determining the matrix or the neural network for estimating the spectral reflectance beforehand, and estimating the XYZ three stimulus values or the spectral reflectance of all pixels in the input image with one matrix or neural network.

However, the image to be actually photographed is rarely constituted of only the limited subject. For example, when the image of an upper part of a person's body is inputted, many of the pixels of the image are skin. Therefore, when the subject is limited to the skin, and the regression matrix for estimating the XYZ three stimulus values from the input image data is prepared beforehand, the XYZ three stimulus values of the skin can highly precisely be estimated by the regression matrix. However, when portions other than the skin, such as glasses, clothes, and hair are estimated by the regression matrix, the error disadvantageously becomes considerably large. To solve the problem, when the regression matrix is prepared from more subjects including the glasses and clothes without limiting the subject only to the skin, the precision of the estimated value of the subject other than the skin is raised as compared with use of the regression matrix prepared only for the skin. However, the precision is not very high. On the other hand, the estimate error of the skin which is essential becomes large as compared with the use of the aforementioned regression matrix. This is because the subjects different in statistical property such as the skin, eyeglasses, and clothes are included.

Moreover, when the subject is limited to the skin, the number of dimensions of the spectral reflectance can be lowered to three dimensions by the principal component analysis. However, when the spectral reflectance of more subjects is subjected to the principal component analysis without limiting the subject to the skin, the necessary dimension exceeds three dimensions. For example, in Journal of Optical Society America A, Vol. 3, No. 10, 1986, page 1673, "Evaluation of Linear Models of Surfaces Spectral Reflectance with Small Number of Parameters", a fact that about six or eight dimensions at minimum are required for representing the spectral reflectance of an arbitrary subject is described. Therefore, in the image input apparatus whose number of bands is small in a range of 6 to 8, when the subject is arbitrary, the spectral reflectance cannot uniquely be calculated.

As described above, the method of calculating the XYZ three stimulus values or the spectral reflectance of the subject from the image data of the image input apparatus with the high precision is a problem which remains unsolved.

SUMMARY OF THE INVENTION

The present invention has been developed in consideration of this respect, and an object thereof is to provide an image processing apparatus and image processing method for highly precisely converting color image data inputted from an image input apparatus to a color space which is not dependent on the apparatus and/or lighting.

According to the present invention, there is provided an image processing apparatus comprising: color set determining means for determining a set to which each image signal inputted from an image input apparatus belongs; color conversion processing selecting means for selecting a color conversion processing which differs with each set determined by the color set determining means; and color conversion processing means for converting a color of a noted pixel by the color conversion processing selected by the color conversion processing selecting means. The apparatus has an effect that the image signal inputted from the image input apparatus can be subjected to color conversion with a high precision.

Moreover, in the present invention, a plurality of sets of subjects as main constituting elements of the image inputted from the image input apparatus are set, and means for estimating color data which is not dependent on the apparatus and/or lighting for each set is calculated beforehand. Moreover, it is judged whether or not each pixel of the image data inputted from the image input apparatus belongs to the subject set, the estimating means is selected based on a judgment result, and the color data which is not dependent on the apparatus and/or lighting is estimated. In this case, the color data not dependent on the apparatus and/or lighting can be estimated from the input image data for the preset subject with an extremely high precision and for the subject other than the preset subject with a substantially high precision. Moreover, the number of bases necessary for representing the subject is large in the conventional example, because the base is calculated collectively for many subjects. On the other hand, in the present invention, the subjects are grouped in small sets, the base is determined for each set, and the data is estimated. Thereby, since the number of necessary bases is reduced, the color data not dependent on the apparatus and/or lighting can uniquely be estimated even with the image input apparatus having a small number of bands.

According to the present invention, there is provided an image processing method comprising: a step of learning data constituted of a specified subject for each set beforehand; a step of judging the learned set to which a color of each pixel of the inputted image signal belongs; and a step of subjecting each set to a different color conversion processing, so that the image signal inputted from the image input apparatus can highly precisely be subjected to the color conversion.

Moreover, according to another aspect of the image processing method of the present invention, in the aforementioned image processing method of the present invention, in the color conversion processing, the inputted image signal is converted to the color data not dependent on the apparatus and/or the lighting, so that the image signal inputted from the image input apparatus can highly precisely be converted to a color space not dependent on the apparatus and/or lighting.

Furthermore, according to further aspect of the image processing method of the present invention, in the aforementioned image processing method of the present invention, when the color of each pixel of the inputted image signal belongs to any one of the sets, the color conversion processing comprises converting the signal to the color data in a method using a statistical property of each set. Therefore, the image signal belonging to the set with a high precision, and even the image signal not belonging to the set with an appropriate precision can be converted to the color space which is not dependent on the apparatus and/or the lighting.

Additionally, according to another aspect of the image processing method of the present invention, in the aforementioned image processing method of the present invention, during the conversion to the color data using the statistical property of each set, a multiple regression analysis is used. Therefore, the image signal which belongs to the set can highly precisely be converted to the color space which is not dependent on the apparatus and/or the lighting.

Moreover, according to another aspect of the image processing method of the present invention, the image processing method of the present invention comprises using a neural network in the conversion to the color data using the statistical property of each set, so that the image signal belonging to the set can highly precisely be converted to the color space not dependent on the apparatus and/or the lighting.

Furthermore, according to another aspect of the image processing method of the present invention, in the aforementioned image processing method of the present invention, when the color of each pixel of the inputted image signal belongs to any one of the sets, the color conversion processing comprises weighting the color data calculated using the statistical property of the set, and the color data calculated as the statistical property of a broad range of set in accordance with reliability with which the color belongs to the set, and converting the color data. Therefore, when the color data not dependent on the apparatus and/or the lighting is converted to the image for an output apparatus, a pseudo contour in an output image can advantageously be reduced.

Additionally, according to another aspect of the image processing method of the present invention, the image processing method of the present invention comprises a step of judging the set to which the color of each pixel belongs by agreement to the statistical property of each set. Therefore, the set to which each pixel belongs can be judged.

Moreover, according to another aspect of the image processing method of the present invention, in the aforementioned image processing method of the present invention, the statistical property is an average value. The set to which each pixel belongs can highly precisely be judged.

Furthermore, according to another aspect of the image processing method of the present invention, in the aforementioned image processing method of the present invention, the statistical property is a Mahalanobis distance. The set to which each pixel belongs can highly precisely be judged.

Additionally, according to another aspect of the image processing method of the present invention, the aforementioned image processing method of the present invention comprises judging the set to which the color of each pixel belongs by a difference between the color data obtained supposing that the color belongs to the set or a region and not dependent on the apparatus and/or the lighting, and the color data obtained supposing that the color does not belong to any set or region and not dependent on the apparatus and/or the lighting. The set to which each pixel belongs can highly precisely be judged.

Moreover, according to another aspect of the image processing method of the present invention, in the aforementioned image processing method of the present invention, the set to which the color of each pixel belongs is judged by the neural network, and the set to which each pixel belongs can be judged.

Furthermore, according to another aspect of the image processing method of the present invention, the aforementioned image processing method of the present invention comprises judging peculiar data deviating from the set from the statistical property of each set in each set, and using an appropriate set from which the peculiar data is removed. The set having a clear statistical property can be obtained by removing the peculiar data.

Therefore, the set to which the color of each pixel belongs can highly precisely be judged.

Additionally, according to another aspect of the image processing method of the present invention, the aforementioned image processing method of the present invention comprises calculating separatability between the sets from the statistical property of each set, and using a set which is high in the separatability. Therefore, the set to which the color of each pixel belongs can highly precisely be judged.

Moreover, according to another aspect of the image processing method of the present invention, in the aforementioned image processing method of the present invention, the separatability is an independence of a partial space constituted of each set in an image data space. Therefore, the set to which the color of each pixel belongs can highly precisely be judged.

Furthermore, according to another aspect of the image processing method of the present invention, in the aforementioned image processing method of the present invention, the separatability is the independence of the partial space constituted of each set in the color space which is not dependent on the apparatus and/or the lighting. Therefore, the set to which the color of each pixel belongs can highly precisely be judged.

Additionally, the present invention comprises learning a distribution of a specified object photographed beforehand in the image in the color space after conversion for each set during the color conversion of each pixel of the image, performing tentative color conversion from the input image signal, using the signal after the tentative color conversion to judge the set to which the color belongs in the color space after the conversion, and applying a color conversion processing which differs with each judged set. Moreover, when it is difficult to automate the set judgment, a user indicates/judges the set. In this manner, the set to which the input image signal belongs is judged by the color space after the conversion, or by indication by the user, and further the precision of the color conversion can be enhanced.

Moreover, the image processing method of the present invention comprises: a step of learning a distribution of a specified object in the color space after color conversion for each set during the color conversion of the image; a step of performing tentative color conversion from the inputted image signal; a step of using the signal after the tentative color conversion to judge the set to which the color belongs in the color space after the color conversion; and a step of applying a color conversion processing which differs with each judged set. There is an effect that the image signal inputted from the image input apparatus can highly precisely be subjected to the color conversion.

Furthermore, according to another aspect of the image processing method of the present invention, in the image processing method of the present invention, the color conversion processing comprises converting the inputted image signal to the color data which is not dependent on the image input apparatus and/or the lighting. There is an effect that the image signal inputted from the image input apparatus can highly precisely be subjected to the color conversion.

Additionally, according to another aspect of the image processing method of the present invention, in the image processing method of the present invention, the color conversion processing comprises conversion to the spectral reflectance, and there is an effect that the image signal inputted from the image input apparatus can highly precisely be subjected to the color conversion.

Moreover, according to another aspect of the image processing method of the present invention, in the image processing method of the present invention, the color conversion processing comprises conversion to XYZ three stimulus values, and there is an effect that the image signal inputted from the image input apparatus can highly precisely be subjected to the color conversion.

Furthermore, according to another aspect of the image processing method of the present invention, in the aforementioned image processing method of the present invention, with the color conversion processing comprising the conversion to the spectral reflectance, judgment of the set to which the color of each pixel of the inputted image signal belongs comprises tentatively estimating a base coefficient of the spectral reflectance from the color of each pixel, and judging the set in a base coefficient space. There is an effect that the image signal inputted from the image input apparatus can highly precisely be subjected to the color conversion.

Additionally, according to another aspect of the image processing method of the present invention, in the aforementioned image processing method of the present invention, when the color of each pixel of the inputted image signal belongs to any one of the sets, the color conversion processing comprises the color conversion by a method using the statistical property of each set. There is an effect that the image signal inputted from the image input apparatus can highly precisely be subjected to the color conversion.

Moreover, according to another aspect of the image processing method of the present invention, in the aforementioned image processing method of the present invention, the color conversion processing comprises the color conversion by a method using the statistical property of each set when the color of each pixel of the inputted image signal belongs to any one of the sets, and by a method using the statistical property of a broad range of set when the color does not belong to any set. There is an effect that the image signal inputted from the image input apparatus can highly precisely be subjected to the color conversion.

Furthermore, according to another aspect of the image processing method of the present invention, in the aforementioned image processing method of the present invention, multiple regression analysis is used in the color conversion using the statistical property of each set, and there is an effect that the image signal inputted from the image input apparatus can highly precisely be subjected to the color conversion.

Additionally, according to another aspect of the image processing method of the present invention, in the aforementioned image processing method of the present invention, a neural network is used in the color conversion using the statistical property of each set, and there is an effect that the image signal inputted from the image input apparatus can highly precisely be subjected to the color conversion.

Moreover, according to another aspect of the image processing method of the present invention, in the aforementioned image processing method of the present invention, when the color of each pixel of the inputted image signal belongs to any one of the sets, the color conversion processing comprises converting color data calculated using the statistical property of the set, and color data judged to be statistically non-correlated and calculated to the color data weighted in accordance with reliability with which the color belongs to the set. There is an effect that the image signal inputted from the image input apparatus can highly precisely be subjected to the color conversion.

Furthermore, according to another aspect of the image processing method of the present invention, in the aforementioned image processing method of the present invention, when the color of each pixel of the inputted image signal belongs to any one of the sets, the color conversion processing comprises converting color data calculated using the statistical property of the set, and color data calculated in a method using the statistical property of a broad range of set to the color data weighted in accordance with reliability with which the color belongs to the set. There is an effect that the image signal inputted from the image input apparatus can highly precisely be subjected to the color conversion.

Additionally, according to another aspect of the image processing method of the present invention, in the aforementioned image processing method of the invention, the set to which the color of each pixel belongs is judged by agreement to the statistical property of each set in the color space after the conversion. Therefore, the set to which the image signal inputted from the image input apparatus belongs can highly precisely be judged.

Moreover, according to another aspect of the image processing method of the present invention, in the aforementioned image processing method of the present invention, the statistical property is an average value, and the set to which the image signal inputted from the image input apparatus belongs can highly precisely be judged.

Furthermore, according to another aspect of the image processing method of the present invention, in the aforementioned image processing method of the present invention, the statistical property is a Mahalanobis distance. The set to which the image signal inputted from the image input apparatus belongs can highly precisely be judged.

Additionally, according to another aspect of the image processing method of the present invention, in the aforementioned image processing method of the present invention, the statistical property is an average value and a Mahalanobis distance. The set to which the image signal inputted from the image input apparatus belongs can highly precisely be judged.

Moreover, according to another aspect of the image processing method of the present invention, in the aforementioned image processing method of the present invention, the set to which the color of each pixel belongs is judged by a neural network whose input is a value of the color space after the color conversion. The set to which the image signal inputted from the image input apparatus belongs can highly precisely be judged.

Furthermore, according to another aspect of the image processing method of the present invention, in the aforementioned image processing method of the present invention, the set to which the color of each pixel belongs is judged by a user, and the set to which the image signal inputted from the image input apparatus belongs can highly precisely be designated.

BRIEF DESCRIPTION OF THE DRAWINGS

An object and characteristic of the present invention will further be apparent from preferred embodiments of the present invention described with reference to the following drawings.

PREFERRED EMBODIMENTS OF THE INVENTION

Figure 1:
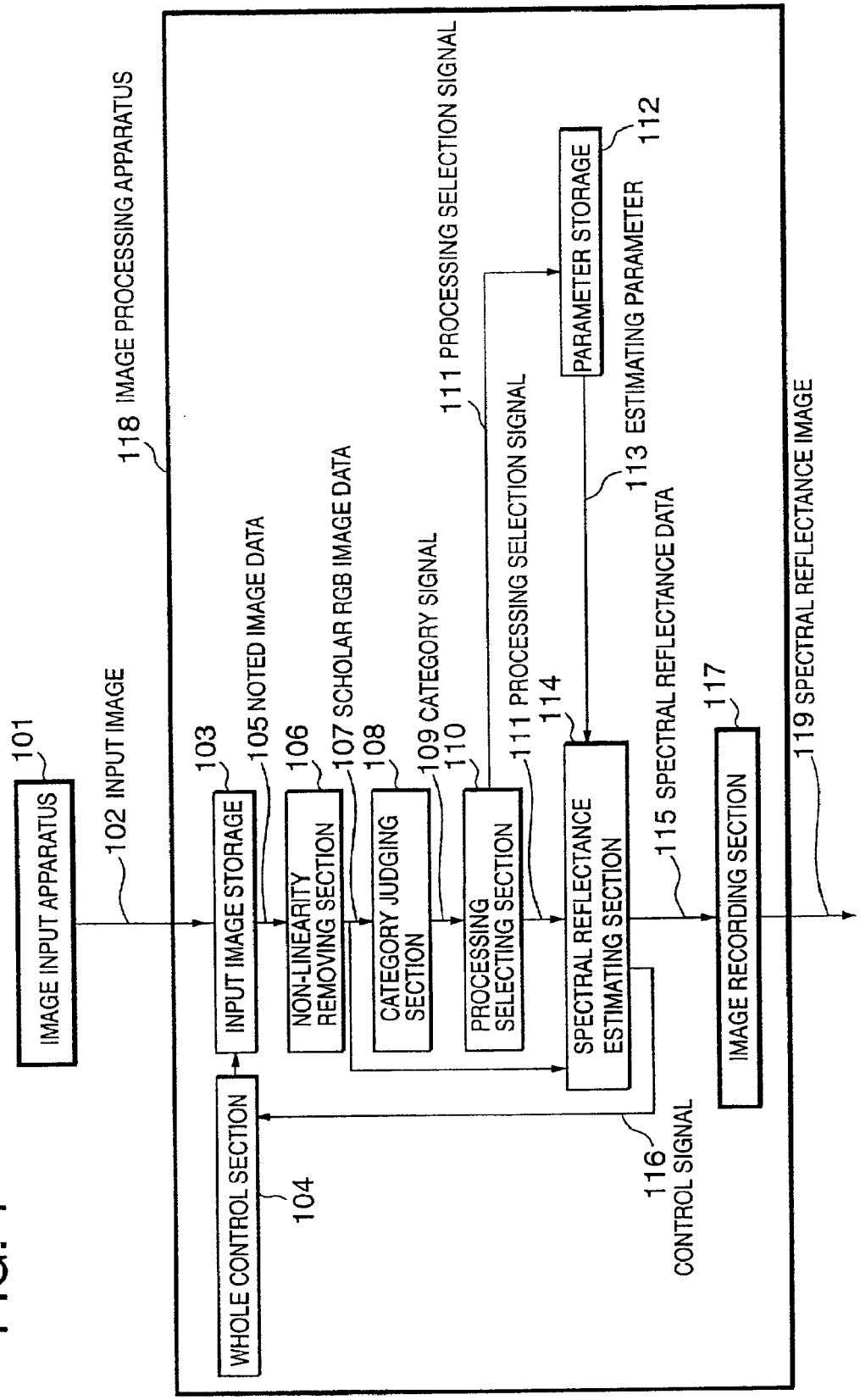
FIG. 1 is a block diagram of an image processing apparatus according to a first embodiment of the present invention.

Preferred embodiments of the present invention will be described hereinafter in detail with reference to the drawings.

(First Embodiment)

The present invention comprises setting a plurality of sets of subjects as main constituting elements of an image inputted from an image input apparatus, and calculating means for estimating color data which is not dependent on the apparatus and/or lighting beforehand for each set. Moreover, it is judged whether or not each pixel of the image data inputted from the image input apparatus belongs to the subject set, the estimating means is selected based on a judgment result, and the color data which is not dependent on the apparatus and/or the lighting is estimated. In this case, the color data which is not dependent on the apparatus and/or the lighting is highly precisely estimated.

Generally, increasing of the number of bands of a sensor is considered in order to highly precisely estimate the color data. Reasons for increasing the sensor lie in the following two respects. First, even when the number of bases necessary for representing spectral reflectance of a subject is large, a base coefficient can uniquely be calculated by setting the same number of bands of a camera as that of bases. Moreover, secondly, a possibility that the subject having a different spectral reflectance has the same signal value of the image input apparatus is reduced. This is called sensor metamerism. However, the image input apparatus becomes expensive with multi-band, and it is therefore preferable to estimate XYZ three stimulus values and spectral reflectance of the subject by the image input apparatus whose band number is as small as possible. The number of bases necessary for the subject increases, because the base is obtained collectively for many subjects.

On the other hand, in the present invention, the subjects are classified into small categories, and the color data is estimated fo reach category. Additionally, a set of the subjects (objects) will be referred to as the category hereinafter. In a field of color image processing, category indicates a categorical naming in which inside of a color space of red, orange, blue or the like is classified by similar color names in many cases. However, it is noted that the category for use herein has a meaning different from that of the categorical naming. In the present invention, the set of objects whose spectral reflectance can be estimated by the same estimating equation is called the category. Therefore, it is proposed that the objects similar to one another in statistical property in a spectral reflectance space or the color space should be classified as one category. In this case, the subject can highly precisely be estimated even with the image input apparatus having a small number of bands. A possibility that the aforementioned first problem can be solved without increasing the number of bands is raised. Additionally, in order to reduce the sensor metamerism as the second problem, the corresponding increase of the number of bands would be necessary.

To solve the problem, in the present embodiment, a digital camera having an output of RGB three bands is assumed as a most general image input system. A method of estimating the spectral reflectance of the subject as the data not dependent on the apparatus and/or the lighting from RGB image data will be described. Moreover, to simplify the description, a case in which the number of categories is two will be described.

FIG. 1 is a block diagram of an image processing apparatus for estimating spectral reflectance image data from RGB image data of the input apparatus according to a first embodiment. FIG. 1 shows: an image input apparatus 101 for obtaining image data of RGB three bands; an input image 102; an input image storage 103 for storing the input image 102; a whole control section 104 for processing/controlling each pixel of the input image 102; noted image data 105 as a pixel value of each pixel read from the input image storage 103 in accordance with an instruction of the whole control section 104; a non-linearity removing section 106 for removing non-linearity from the noted image data 105; image data 107 (hereinafter referred to as scholar image data or scholar RGB image data) from which the obtained non-linearity is removed by the non-linearity removing section 106; a category judging section 108 for judging a category to which the scholar image data 107 belongs; a category signal 109 judged by the category judging section 108; a processing selecting section 110 for outputting a processing selection signal 111 as an instruction for reading a parameter for use in estimating spectral reflectance in response to the category signal 109; the processing selection signal 111 outputted from the processing selecting section 110; a parameter storage 112 for storing the parameter for estimating the spectral reflectance calculated beforehand for each category; an estimating parameter 113 read from the parameter storage 112 in accordance with an instruction of the processing selection signal 111; a spectral reflectance estimating section 114 for using the estimating parameter 113 to estimate the spectral reflectance; spectral reflectance data 115 of the estimated noted image data 105; a control signal 116 indicating that the spectral reflectance estimate of the noted image data 105 ends; an image recording section 117 for recording spectral reflectance data; an image processing apparatus 118; and a spectral reflectance image 119 outputted from the image processing apparatus.

An operation of the image processing apparatus of FIG. 1 will be described. The image data 102 inputted from the image input apparatus 101 is stored in the input image storage 103. Moreover, a pixel value is successively read as the noted image data 105 to the non-linearity removing section 106 from the input image storage 103 in accordance with an instruction of the whole control section 104. The non-linearity removing section 106 converts the noted image data 105 to the scholar image data 107. Subsequently, it is judged whether or not the scholar image data belongs to any one of a plurality of categories stored beforehand, and a judgment result is outputted as the category signal 109. The processing selecting section 110 receives the category signal 109, and reads a spectral reflectance estimating parameter for the judged category from the parameter storage 112. The spectral reflectance estimating parameter for each category is stored beforehand in the parameter storage 112. The spectral reflectance estimating section 114 uses the estimating parameter 113 read from the parameter storage 112 to estimate the spectral reflectance from the scholar image data 107. The obtained spectral reflectance data 115 is recorded in the image recording section 117. When these series of processing end with respect to the noted image data 105, the spectral reflectance estimating section outputs the control signal 116 indicating the end of the processing to the whole control section 104. When the whole control section 104 receives the control signal 116, the image data as the next processing object is read as the noted image data 105 from the input image storage 103. This is repeated with respect to all the pixels of the input image 102.

A detailed operation of the non-linearity removing section 106 will next be described. For example, a multilayered perceptron can be used to perform the processing in the non-linearity removing section 106. The multilayered perceptron is one of neural networks, weight and threshold value as neuron parameters are learned beforehand, and the parameters obtained through the learning are used to estimate the reflectance. For the multilayered perceptron used herein, an input is image data, and an output is data obtained by removing non-linearity from the image data, that is, scholar image data.

Figure 2:
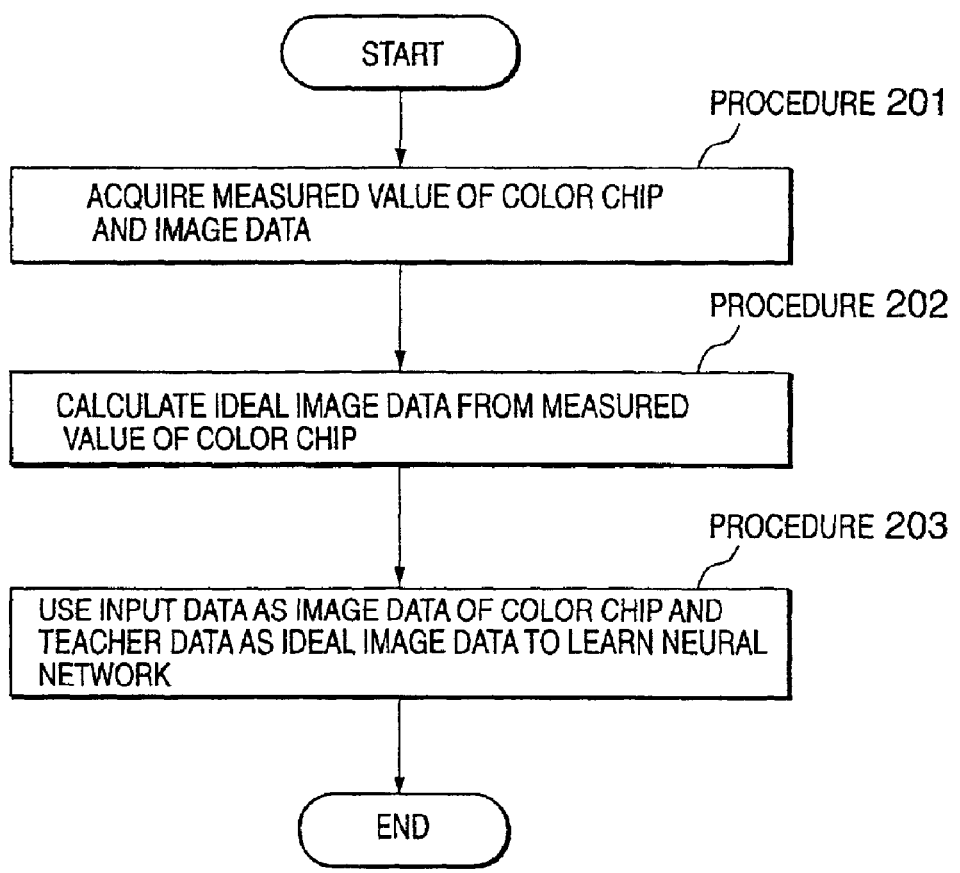
FIG. 2 is a flowchart showing a learning procedure of a non-linearity removing neural network according to the first embodiment.

A parameter learning procedure of the multilayered perceptron will be described with reference to FIG. 2. In procedure 201 the image data and measured color value of a color chip constituted of a plurality of colors are acquired beforehand. Subsequently, in procedure 202, ideal image data predicted using a signal generation model of the image input apparatus 101 is calculated from the measured color value of the color chip. Subsequently, in procedure 203 the image data 102 is used as input data and the ideal image data is used as teacher data to learn the weight and threshold value.

A method of calculating the ideal image data in the procedure 202 will be described in detail. The ideal image data can be obtained by assigning the measured color value of the color chip to the signal generation model of the image input apparatus 101. The signal generation model can be represented by equation 5 using spectral reflectance $R(\lambda)$ of a subject, spectral distribution $S(\lambda)$ of lighting, and spectral sensitivities $C_R(\lambda)$, $C_G(\lambda)$, $C_B(\lambda)$ of RGB three bands of the image input apparatus 101. It is assumed that the spectral sensitivity of the image input apparatus 101 and the spectral distribution of the lighting are known.

$$\begin{cases} R' = \int C_R(\lambda)S(\lambda)R(\lambda)d\lambda \\ G' = \int C_G(\lambda)S(\lambda)R(\lambda)d\lambda \\ B' = \int C_B(\lambda)S(\lambda)R(\lambda)d\lambda \end{cases} \quad (5)$$

Figure 3:
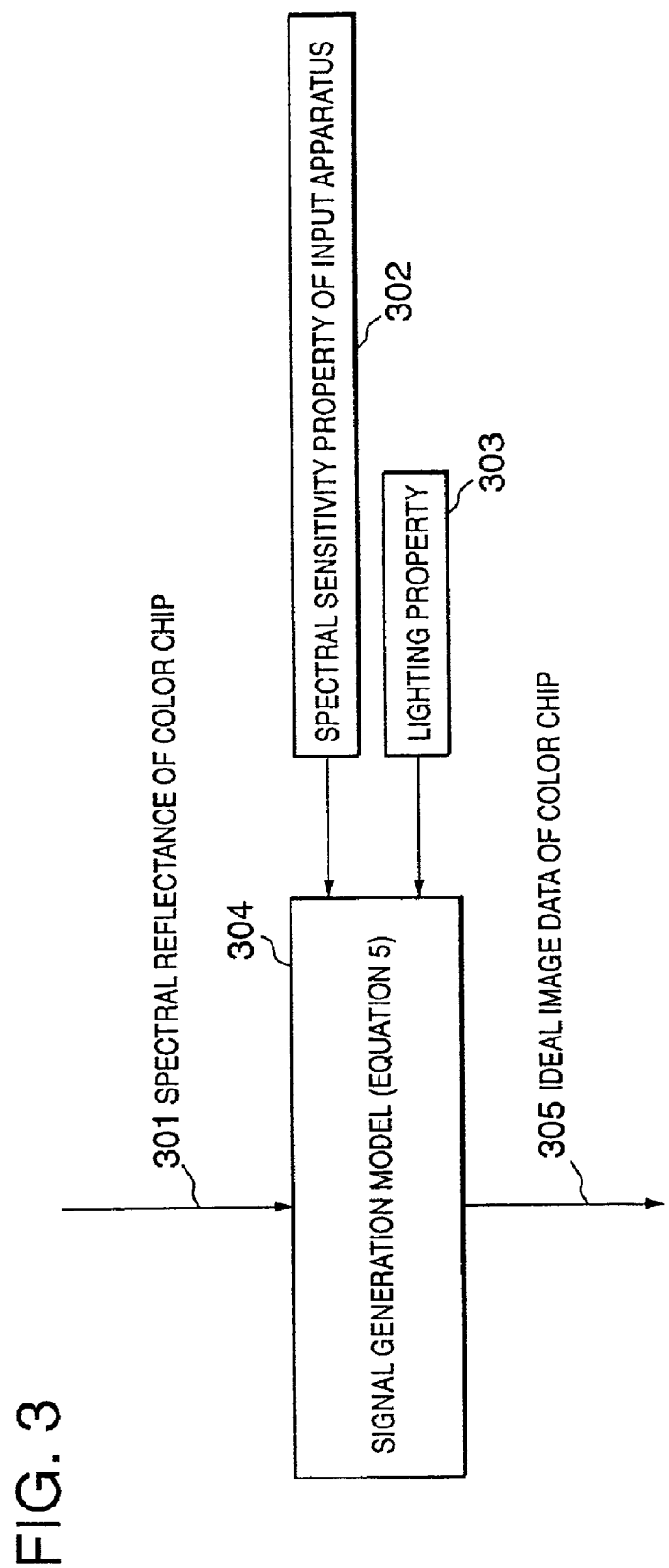
FIG. 3 is a diagram showing a signal generation model according to the first embodiment.

In the equation 5, R', G', B' obtained by assigning the spectral reflectance of the color chip to $R(\lambda)$ are ideal image data. FIG. 3 shows an explanatory view of the signal generation model of the equation 5. FIG. 3 shows: a spectral reflectance 301 of the color chip to be assigned to the signal generation model; a known spectral sensitivity property 302 of the image input apparatus 101; a lighting property 303 of the image data 102 during photographing; a signal generation model 304 of the equation 5; and the ideal image data 305 of the color chip. As shown in FIG. 3, when the spectral sensitivity property 302 of the image input apparatus 101, lighting property 303, and spectral reflectance 301 of the subject are given to the signal generation model, that is, the equation 5, the ideal image data 305 of the subject is obtained.

An estimating procedure by the neural network of the weight and threshold value learned as described above will next be described. The noted image data 105 is inputted to the learned neural network in the non-linearity removing section 106. Thereby, the scholar image data 107 is obtained in the output of the neural network. The operation of the non-linearity removing section 106 has been described above.

A detailed operation of the category judging section 108 as the characteristic of the present invention will next be described. The category constituted of a specified subject is set before the image processing operation in FIG. 1. For the category, an object whose spectral reflectance is to be estimated with a particularly high precision may be set. For example, skin, grass green, and the like are considered to be important in color reproduction, and therefore the human skin as a category 1 and the grass green as a category 2 are set.

Figure 4:
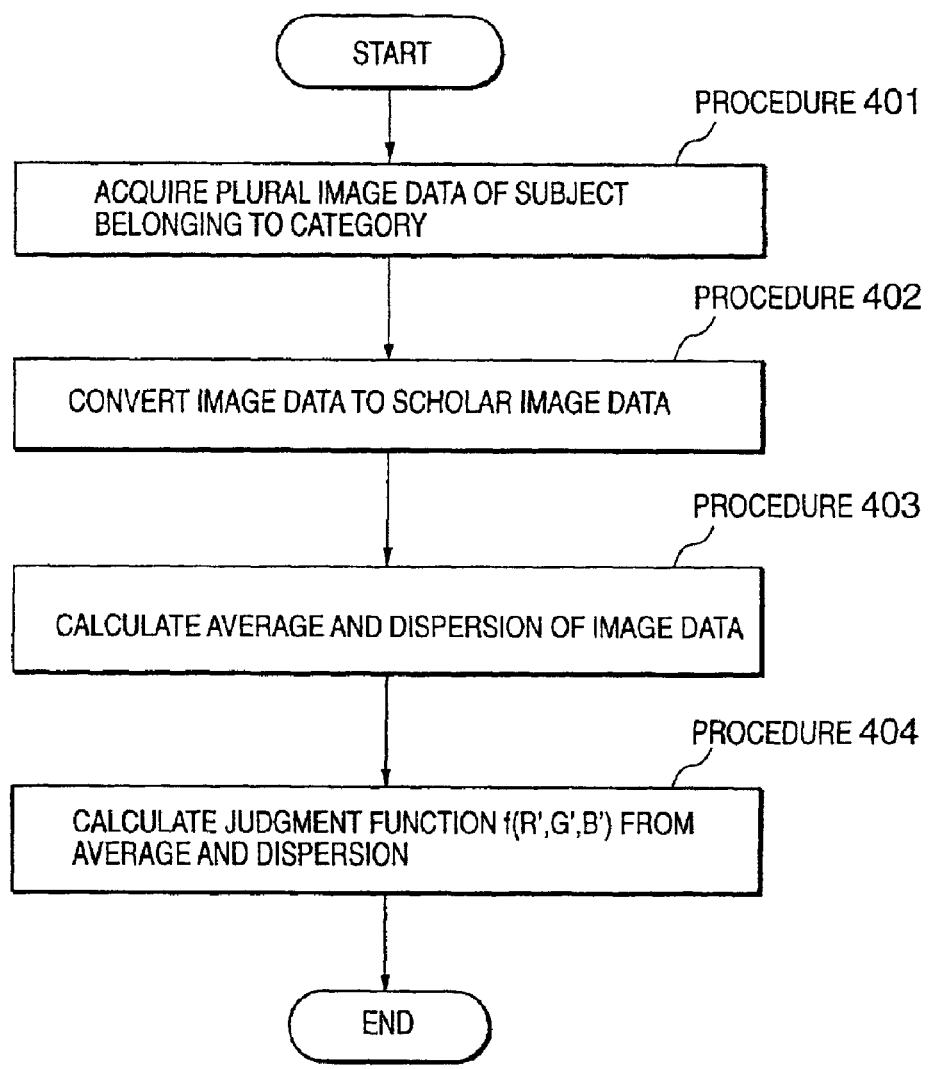
FIG. 4 is a flowchart showing a procedure of calculating a judgment function f according to the first embodiment.
Figure 5:
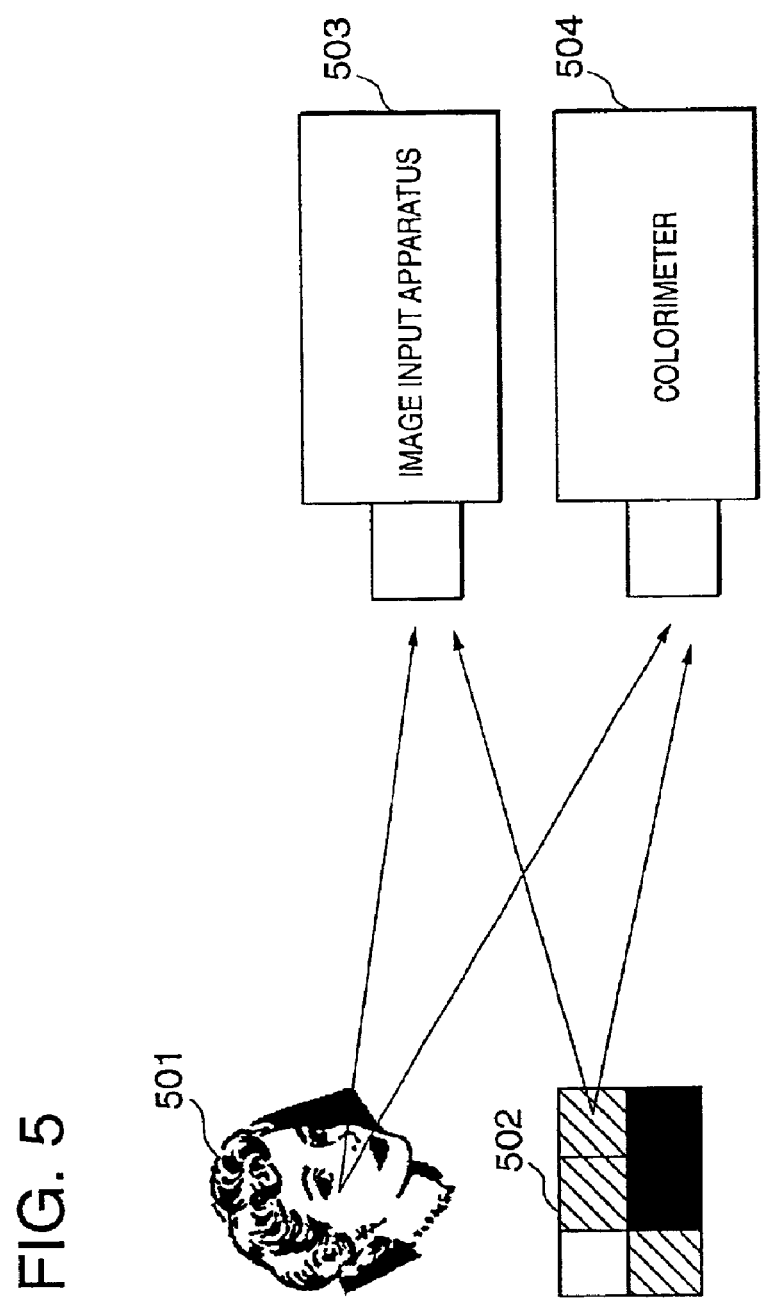
FIG. 5 is an explanatory view for obtaining category image data and measured color value.

After the category is set, the statistical property of each category is calculated. A calculating procedure of the statistical property for each category will be described with reference to FIG. 4. In procedure 401, a plurality of image data of the subject belonging to the category are acquired. For example, when the subject is the skin, as shown in FIG. 5, the image data of the skin may actually be inputted, or the color chip with the reflectance of the skin spectrally reproduced therein may be inputted. In procedure 402, the scholar image data is calculated from the image data in a processing similar to that of the non-linearity removing section 106. In procedure 403, an average value and dispersion of the scholar image data are calculated, and the obtained average value and dispersion are stored as the statistical property of the category. In procedure 404, a judgment function is prepared. The judgment function will be described.

First, it is assumed that the data belonging to the category conforms to a normal distribution represented by the average and dispersion obtained in the procedure 402. An equation of the normal distribution is represented as equation 6.

$$f_{Gauss}(x) = \frac{1}{N} \frac{1}{\sqrt{2\pi\sigma}} \exp\left\{-\frac{(x-\mu)^2}{2\sigma^2}\right\} \quad (6)$$

In the equation 6, N denotes $f_{Gauss}(\mu)$, and is a coefficient introduced to be normalized to 1 with $f_{Gauss}(\mu)$. When the image input apparatus 101 is of three bands, the equation 6 is prepared for each band, and a product of obtained $f_R(x)$, $f_G(x)$, $f_B(x)$ is used as the judgment function and represented by equation 7.

$$f(R',G',B') = f_R(R')f_G(G')f_B(B') \quad (7)$$

As described above, the judgment function is obtained for each category.

Figure 6:
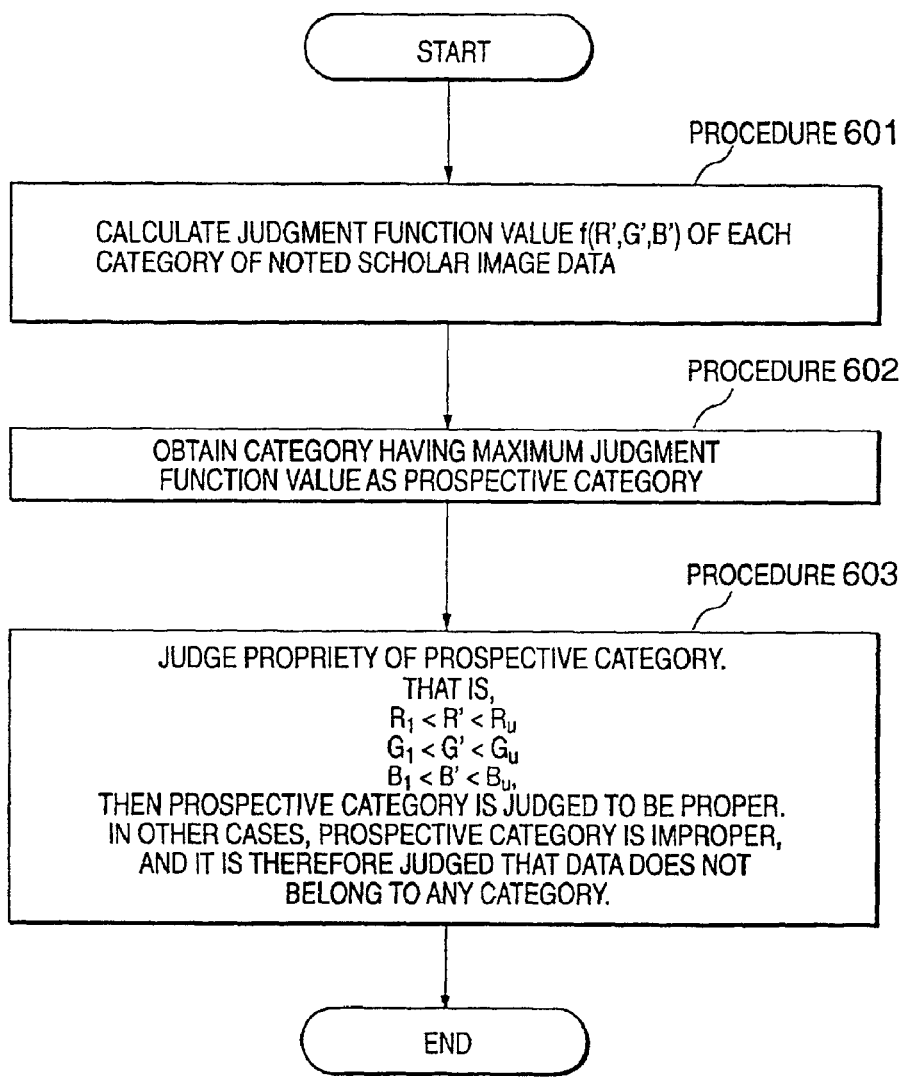
FIG. 6 is a flowchart showing a category judging procedure using the judgment function f according to the first embodiment.

An operation procedure of the category judging section 108 using the judgment function obtained in the aforementioned procedure will next be described with reference to FIG. 6. In procedure 601, scholar RGB image data (R',G',B') is assigned to the judgment function (equation 7) of each category to calculate a judgment function value. In procedure 602, a category with a largest judgment function value is obtained as a prospective category. In procedure 603, it is judged whether the prospective category obtained in the procedure 602 is proper. When the inputted scholar RGB image data (R',G',B') is close to an average value ($\mu_R'$, $\mu_G'$, $\mu_B'$) of the prospective category, the category is judged to be proper.

A concrete calculating procedure of the procedure 603 will be described. First, for a normal distribution function $f_R(x)$ of R', for example, a value indicating a reliability division of 80% is an upper limit threshold value $R_u$, and a value indicating a 20% reliability division is a lower limit threshold value $R_l$. The upper and lower threshold values are similarly calculated with respect to G', B' in this manner. When the inputted scholar RGB image data (R',G',B') is within the threshold value, the scholar image data is judged to belong to the prospective category obtained in the procedure 602. Outside the threshold value, it is judged that the data does not belong to any category. In the above category judging method, it is only judged whether the respective values R', G', B' are close to the average value indicated by the category in the space of the scholar image data. Therefore, respective correlations among R', G', B' are not considered. If the correlation of R', G', B' is considered, higher-precision category judgment can be realized.

As the higher-precision category judging method taking the correlation of R', G', B' into consideration, in addition to the judgment by the normal distribution, judgment by Mahalanobis distance is performed. This method will be described.

The Mahalanobis distance is defined by equation 8. In the equation 8, $\Sigma$ denotes a correlation matrix of the scholar RGB image data, $\mu$ denotes an average vector of the scholar RGB image data, and x denotes a scholar RGB image data vector to be judged.

$$g(x)=(x-\mu)'\Sigma^{-1}(x-\mu) \tag{8}$$

According to g(x) of equation 8, the distance from the category of inputted scholar RGB image data x is normalized by the correlation matrix $\Sigma$, and therefore a judgment value with the correlation among R', G', B' considered therein can be obtained.

Alternatively, h(x) of equation 9 is defined as a new judgment value with both the judgment by the equation 8 and the judgment by the equation 7 added thereto.

$$h(x) = \frac{f(x)}{g(x)} \tag{9}$$

In the equation 9, x denotes an arbitrary scholar RGB image data vector, and f(x) means f(R',G',B') of the equation 7. With a larger value of f(x) of the equation 7, and with a smaller value of Mahalanobis distance g(x) of the equation 8, a possibility that the data belongs to the category is higher. Therefore, with a larger value of h(x) of the equation 9, the possibility that the data belongs to the category is higher, and both judgment standards of equations 8 and 9 are considered in the value.

Figure 7:
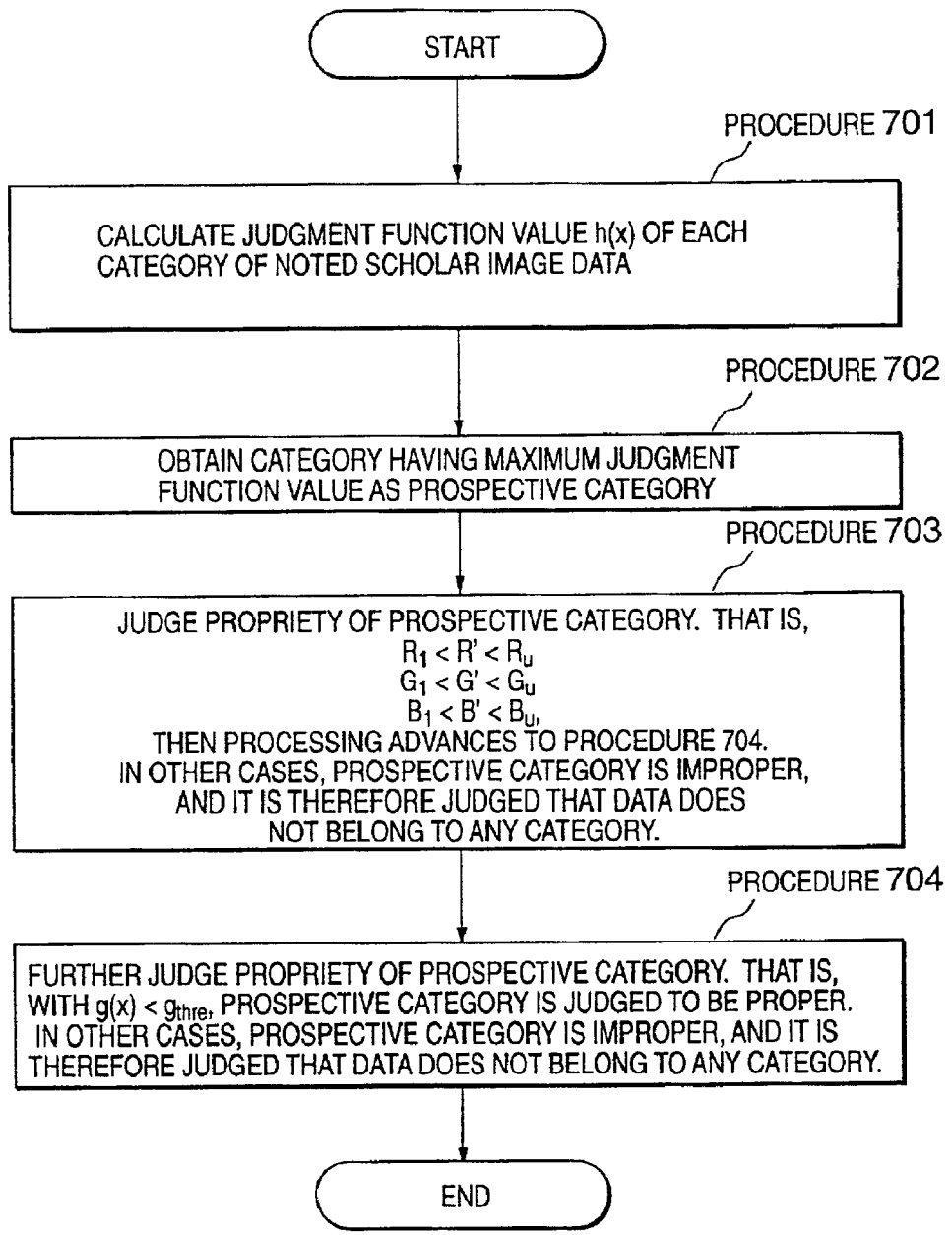
FIG. 7 is a flowchart showing a category judging procedure using a judgment function h according to the first embodiment.

An operation procedure of the category judging section 108 using the aforementioned judgment function h(x) will be described with reference to FIG. 7. In procedure 701, the scholar RGB image data (R',G',B') is assigned to the judgment function h(x) (equation 9 ) of each category and the judgment function value is calculated. In procedure 702, the category having the maximum judgment function value is obtained as the prospective category. In procedure 703, the threshold value is judged similarly as the procedure 603. That is, when respective values of the inputted scholar image data R', G', B' are within the upper and lower threshold values, the possibility that the scholar image data belongs to the prospective category obtained in the procedure 702 is judged, and the processing advances to procedure 704. Outside the threshold value, it is judged that the data does not belong to any category. Subsequently, in the procedure 704, propriety of the prospective category is judged by Mahalanobis distance. In general, when x conforms to m-dimensional normal distribution, the Mahalanobis distance g(x) is known to conform to $\chi$ square distribution with a freedom degree m. Then, a value indicating a 95% reliability division in the distribution function of the $\chi$ square distribution with the freedom degree m is obtained beforehand as $g_{thre}$. When g(x) is smaller than $g_{thre}$, the data is judged to belong to the prospective category. With a large value, it is judged that the data does not belong to any category. The operation of the category judging section 108 has been described above.

A detailed operation of the processing selecting section 110, parameter storage 112, and spectral reflectance estimating section 114 as another characteristic of the present invention will next be described. The present invention is characterized in that a matrix for estimating the spectral reflectance differs with each category judged by the category judging section 108. The estimating matrix of each category is stored beforehand in the parameter storage 112. On receiving the category signal 109 judged by the category judging section, the processing selecting section 110 reads the matrix for the judged category from a plurality of estimating matrixes stored in the parameter storage 112, and transfers the matrix to the spectral reflectance estimating section 114. The spectral reflectance estimating section 114 uses the designated matrix to estimate the spectral reflectance of the subject from the scholar image data 107. The spectral reflectance is estimated by obtaining the spectral reflectance R($\lambda$) when the scholar image data 107 is assigned to a left side (R',G',B') of the equation 5. In the equation 5, since the scholar image data is in a linear relation with the spectral reflectance, the equation 5 is rewritten in a discrete matrix representation to obtain equation 10.

$$\begin{pmatrix} R' \\ G' \\ B' \end{pmatrix} = A \begin{pmatrix} R1 \\ R2 \\ M \\ Rn \end{pmatrix} \tag{10}$$

The left side of the equation 10 denotes the scholar image data 107, (R1, R2, . . . , Rn)$^T$ is the discrete representation of the spectral reflectance of the subject, and each component indicates, for example, a reflectance in each wavelength of every 10 nm between 400 nm and 700 nm. The matrix A is a matrix determined by the spectral sensitivity of the image input apparatus 101 and spectral distribution of lighting. A problem of using the equation 10 to estimate the spectral reflectance R of the subject from the scholar image data 107 is a linear reverse problem. When the image data is, for example, of RGB three bands, the number of dimensions is remarkably larger than three, and it is difficult to estimate (R1, R2, . . . , Rn)$^T$. Examples of a method of solving the problem include a method of representing the spectral reflectance of the subject by a base function having dimensions lower than n. According to the method, the number of dimensions of the data to be obtained can be reduced. For example, when a base function has three dimensions $0_1(\lambda)$, $0_2(\lambda)$ $0_3(\lambda)$, the equation 5 can be rewritten to equation 11, and the data to be estimated is three-dimensional vector of (a, b, c). Therefore, the equation 10 can be rewritten in equation 12. In the equation 12, matrix B is a matrix determined by the spectral sensitivity of the image input apparatus 101, spectral distribution of the lighting and the base function.

$$\begin{cases} R' = \int C_R(\lambda)S(\lambda)(a\cdot O_1(\lambda)+b\cdot O_2(\lambda)+c\cdot O_3(\lambda))d\lambda \\ G' = \int C_G(\lambda)S(\lambda)(a\cdot O_1(\lambda)+b\cdot O_2(\lambda)+c\cdot O_3(\lambda))d\lambda \\ B' = \int C_B(\lambda)S(\lambda)(a\cdot O_1(\lambda)+b\cdot O_2(\lambda)+c\cdot O_3(\lambda))d\lambda \end{cases} \tag{11}$$

$$\begin{pmatrix} R' \\ G' \\ B' \end{pmatrix} = B \begin{pmatrix} a \\ b \\ c \end{pmatrix} \qquad (12)$$

For example, a base function described, for example, in magazine Color Research and Application, Vol. 19, No. 1, 1994, pp. 4 to 9, "Measurement and Analysis of Object Reflectance Spectrum"0 authored by Viehel can be used. Since the base function is calculated by measuring many natural and artificial subjects, the base function can be said to be considerably general-purpose. Alternatively, the spectral reflectance of Macbeth chart is measured, a principal component of the obtained spectral reflectance is analyzed, and a principal component vector of an upper numeral component may be used as the base function. The equation 12 obtained in this manner is ideally constituted of any subject without particularly limiting the subject. Moreover, since matrix B is a square matrix, a unique solution can be obtained, and precision is substantially of the same degree for any subject. However, the base function cannot represent all the subjects with three dimensions, the equation is established on an assumption that the subject is complete diffusion, further any noise is not considered, and therefore high-precision estimate is impossible. On the other hand, when the subject is limited, as compared with solving of the aforementioned signal generation model (equation 5), a higher-precision solution can be obtained in multiple regression analysis or neural network for estimating the data from the image data regarding the subject and the statistical property of the spectral reflectance data. Additionally, in this case, extremely highly precise estimate can be obtained with respect to the limited subject, but an error becomes extremely large with respect to other subjects. Therefore, in the present invention, a high-precision estimating method is prepared beforehand using the multiple regression analysis, neural network, and the like with respect to the limited subject category. Moreover, the category judging section 108 judges whether each pixel in the inputted image belongs to the limited subject. When the pixel is judged to belong to the category, the estimate for the category using the multiple regression analysis, neural network, and the like is performed. When the pixel is judged not to belong to any category, the estimate by the equation 12 is performed.

Figure 8:
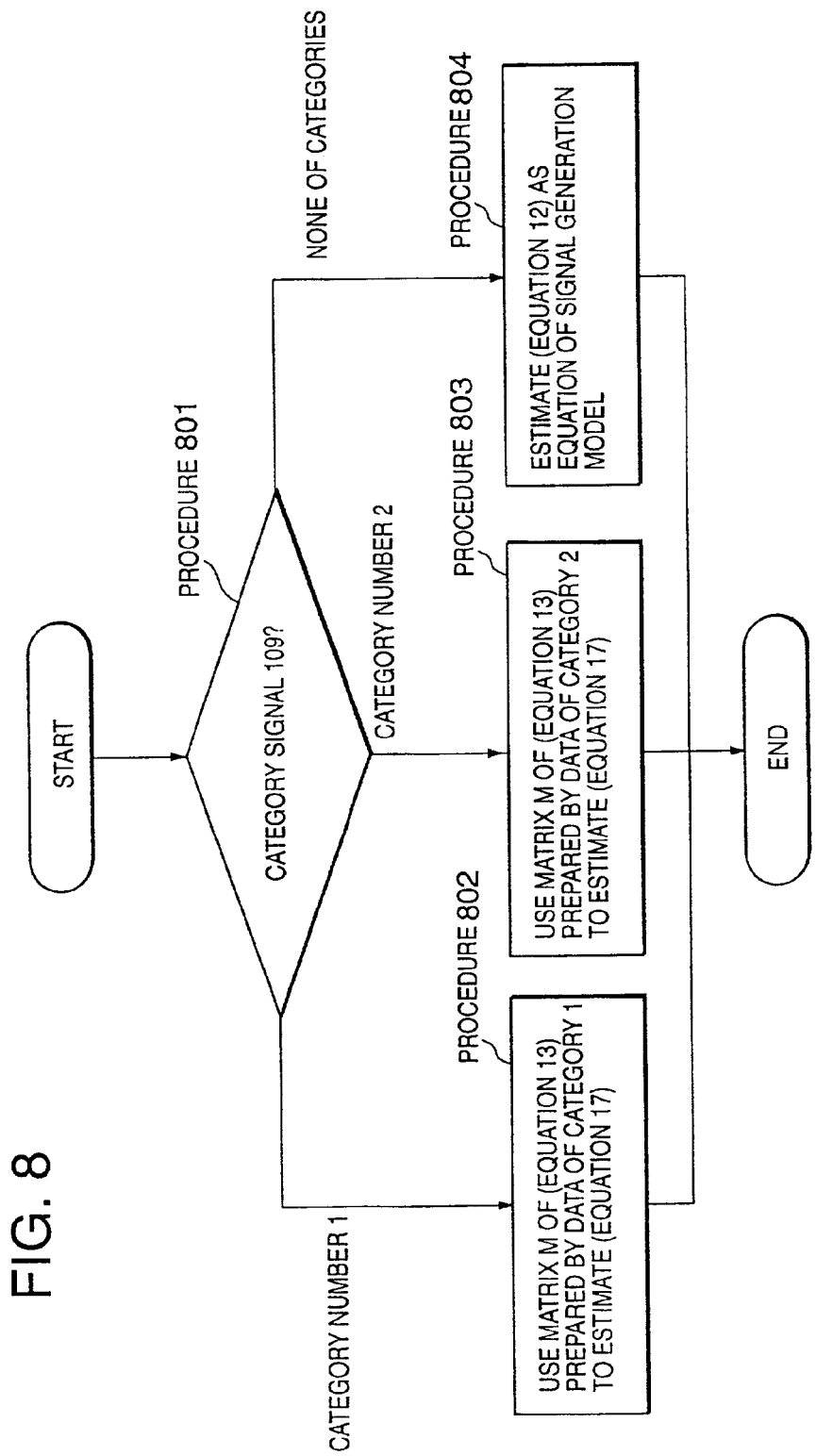
FIG. 8 is a flowchart showing a procedure for selecting different estimating means by a category signal 109 according to the first embodiment.

The present processing will be described with reference to FIG. 8. In FIG. 8, the estimating method for use is changed with the category signal 109 judged by the category judging section 108 (procedure 801). When the category signal 109 belongs to the category 1 or 2, the estimate of the specified subject by the multiple regression analysis or the neural network is performed (procedures 802, 803). When the signal does not belong to any category, the estimate is performed by the equation 12 (procedure 804). In this case, the extremely high-precision estimate can be realized with respect to the specified subject, and a substantially satisfactorily precise solution can be obtained with respect to other subjects.

The estimating method for each category will next be described. A plurality of estimating methods for each category are considered. Here, two types of methods by multiple regression analysis and neural network will be described.

Figure 9:
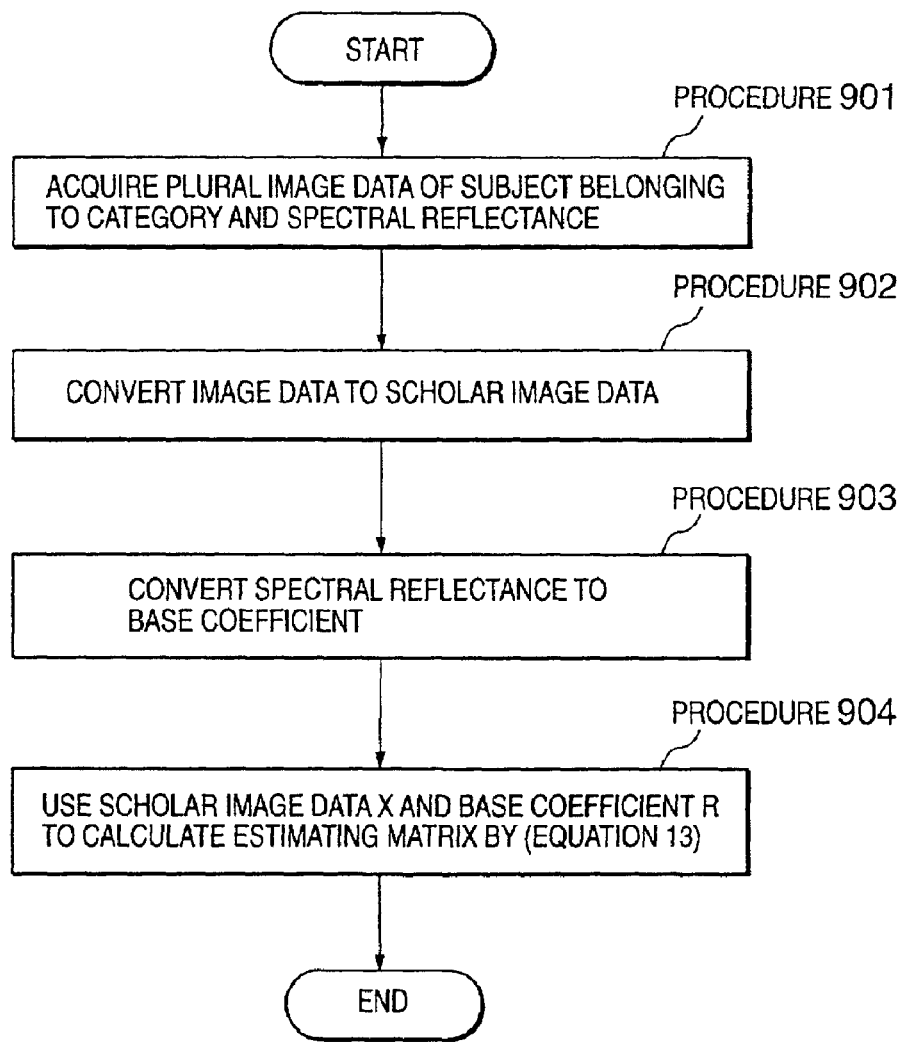
FIG. 9 is a flowchart showing a procedure for preparing a category estimating matrix according to the first embodiment.

First, the method using the multiple regression analysis will be described with reference to FIG. 9. In procedure 901, a plurality of image data of the subject belonging to the category are obtained from an image input section, or a calorimeter is used to obtain the spectral reflectance data. This state is shown in FIG. 5. In procedure 902, the image data is converted to the scholar image data by a processing similar to that of the non-linearity removing section 106. In procedure 903, the spectral reflectance data is converted to a base coefficient. The base function of Viehel et al. may be used similarly as the equation 12, or the spectral reflectance of a plurality of subjects belonging to the category is subjected to principal component analysis and the principal component vector of the upper numerical component may be used. In the latter case, since the base function is also specified for the category, representation precision is enhanced. In procedure 904, the matrix for estimating the base coefficient of the spectral reflectance data from the image data by the multiple regression analysis is prepared.

Details of the procedure 904 will be described. Assuming that a plurality of scholar image data calculated in the procedure 902 are vertical vectors, matrixes laterally arranged for the number of data are X, the base coefficient of the spectral reflectance calculated in the procedure 903 is a vertical vector, and matrixes laterally arranged for the number of data are R, the matrix M for estimating the base coefficient from the image data is represented by equation 13. In the equation 13, $R_{XX}$ denotes a correlation matrix. For example, $R_{RX}$ is a correlation matrix of T and X, and defined by equation 14.

$$M = R_{RX} R_{XX}^{-1} \qquad (13)$$

$$R_{RX} = RX^T \qquad (14)$$

The equation 13 is a matrix determined such that an error of the estimated base coefficient and the base coefficient calculated in the procedure 903 is minimized. The matrix M obtained by the aforementioned procedure is used to estimate the base coefficient $r=(a,b,c)^t$ of the spectral reflectance from the arbitrary scholar image data $x=(R',G',B')^t$.

$$r = Mx \qquad (15)$$

The spectral reflectance is calculated from the obtained base coefficient. The method of preparing the estimating matrix for each category by the multiple regression analysis has been described above.

Here, a relation between the estimating matrixes for each category (equation 13) and (equation 15), and the estimating matrix (equation 12) for use when the data is judged not to belong to any category will be described. Assuming that a matrix constituted by arranging respective band sensitivities of the image input apparatus 101 as a vertical vector is C, and a matrix constituted by arranging base functions as a vertical vector is P, the equation 5 of the signal generation model of the image input apparatus 101 can be represented by equation 16. Here, X denotes a matrix constituted by laterally arranging a plurality of scholar image data calculated in the procedure 902 as the vertical vector for the number of data, and R denotes a matrix constituted by laterally arranging the base coefficients of the spectral reflectance calculated in the procedure 903 as the vertical vector for the number of data.

$$X = C^T PR \qquad (16)$$

When the equations 13 and 16 are assigned to the equation 15, equation 17 results.

$$r = RX^t(XX^t)^{-1}x \quad (17)$$
$$= RR^tP^tC(C^tPRR^tP^tC)^{-1}x$$
$$= RR_{RR}P^tC(C^tPR_{RR}P^tC)^{-1}x$$

In the equation 17, when the subject is not limited, a correlation matrix $R_{RR}$ of the base coefficient of the spectral reflectance is regarded as a unit matrix, and equation 18 results. In the equation 18, + means Moorepenrose's general inverse matrix. When the base functions are used up to the three dimensions for the same number of bands of the image input apparatus, $P^tC$ is a symmetrical matrix, and the equation can be solved by a usual inverse matrix.

$$r = P^tC(C^tPP^tC)^{-1}x \quad (18)$$
$$= (P^tC)^+x$$

With the same base function used in the equations 13 and 12, it should be noted that the equation 18 is equivalent to the equation 12. That is, in the estimating matrix (equation 13), (equation 15) for each category, a case in which the correlation matrix of the base coefficient is a unit matrix corresponds to the solution of the signal generation model of the equation 12.

The neural network as another estimating method for each category will next be described. First, a learning procedure of the neural network will be described with reference to FIG. 10. In procedure 1001, the image data of a plurality of subjects belonging to the category is obtained from the image input apparatus, and the calorimeter is used to obtain the spectral reflectance data. This state is shown in FIG. 5. In procedure 1002, the image data is converted to the scholar image data by the processing similar to that of the non-linearity removing section 106. In procedure 1003, the spectral reflectance data is converted to the base coefficient. The base function of Viehel et al. may be used similarly as the equation 12, or the spectral reflectance of a plurality of subjects belonging to the category is subjected to principal component analysis and the principal component vector of the upper numerical component may be used. In the latter case, since the base function is also specified for the category, the representation precision is enhanced. Next in procedure 1004, the threshold value and weight of the neural network for estimating the base coefficient of the spectral reflectance are learned from the scholar image data. The multilayered perceptron is used as the neural network, the scholar image data calculated in the procedure 1002 is used as the input data, and the base coefficient calculated in the procedure 1003 is used as the teacher data to learn the threshold value and weight.

When the arbitrary scholar image data is inputted to the neural network having the threshold value and weight obtained by the aforementioned learning, the base coefficient of the spectral reflectance is obtained as an output. Thereafter, the obtained base coefficient is converted to the spectral reflectance. The operations of the respective components of the image processing apparatus of FIG. 1 have all been described above.

Figure 11:
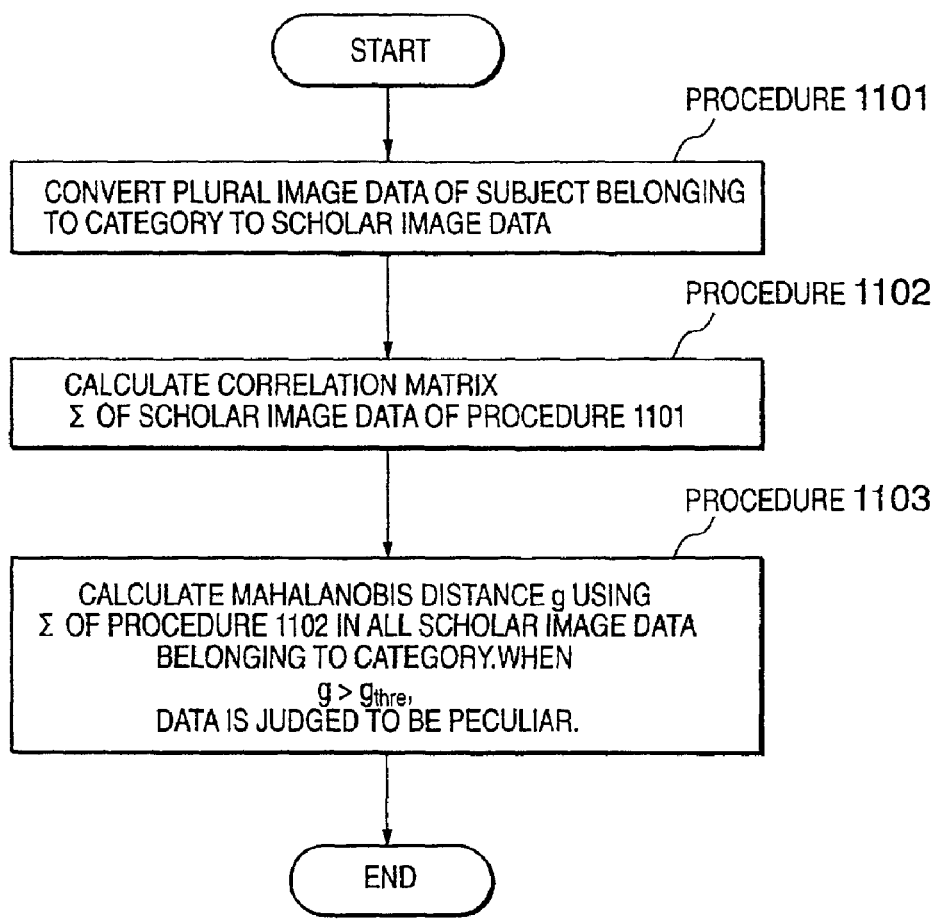
FIG. 11 is a flowchart showing a procedure for judging peculiarity in data in the category according to the first embodiment.

In order to operate the present image processing apparatus as efficiently as possible, there are two important respects. One respect is whether the data acquired in the procedure 401, 901, or 1001 is appropriate as the data forming one category, that is, whether peculiar data deviating from the category is not included. The other respect is whether the categories can be separated from each other. First, the method of judging peculiarity of the data in the category acquired in the procedure 401, 901, 1001 will be described with reference to FIG. 11. First, in procedure 1101, the image data acquired in the procedure 401, 901, 1001 is converted to the scholar image data in the processing similar to that of the non-linearity removing section 106. In processing 1102, an average $\mu$ and correlation matrix $\Sigma$ of the obtained scholar image data are calculated. In procedure 1103, the Mahalanobis distance g(x) of each scholar image data is obtained by the equation 8, and it is judged that the data with the Mahalanobis distance larger than the threshold value is peculiar. The data judged to be peculiar in this manner may be removed from the data in the category. For example, the threshold value for use in the procedure 1103 is obtained as follows. In general, when x conforms to the m-dimensional normal distribution, the Mahalanobis distance g(x) is known to conform to the $\chi$ square distribution with the freedom degree m. Then, the value indicating 95% reliability division in the distribution function of the $\chi$ square distribution with the freedom degree m is obtained beforehand as $g_{thre}$. When g(x) is larger than $g_{thre}$, the data is judged to be peculiar.

The aforementioned judgment of the data peculiarity is performed in a scholar RGB space, but the same processing may be performed in a spectral reflectance space, or a space of the base coefficient of the spectral reflectance. For example, in the base coefficient space, the spectral reflectance data acquired in the procedure 401, 901, 1001 is converted to three-dimensional base coefficient, and the same processing may be performed using the base coefficient instead of the scholar image data of procedure 1102, 1103. Additionally, according to experiments, the peculiar data judged in the scholar image data space well agrees with the data having a bad estimate result by the equations 13 and 15. Therefore, more appropriate judgment can be performed in the scholar image data space than in the base coefficient space. The judgment of peculiarity of the data has been described above.

A method of judging separatability of the categories as another important point will next be described. With sufficiently separatable categories, accurate category judgment can be performed. For example, even when a red rose and red color chip similar in color to each other are set as different categories, the image input apparatus 101 captures these colors as the same signal value. Then, the categories cannot be separated. That is, it can be said that the separatability is low. The separatability of the categories depends on whether each category data forms a group in the scholar RGB space. There are three standards for judging the separatability as follows.

"Separatability judgment standard 1" Sections formed by category threshold values $R_1$ and $R_u$, $G_1$ and $G_u$, $B_1$ and $B_u$ do not intersect one another.

"Separatability judgment standard 2" As a result of principal component analysis of the scholar image data of each category by the correlation matrix, a contribution ratio up to two dimensions is high.

"Separatability judgment standard 3" An angle formed by planes formed by the main component vectors up to two dimensions of the scholar image data of each category is as large as possible.

Figure 12:
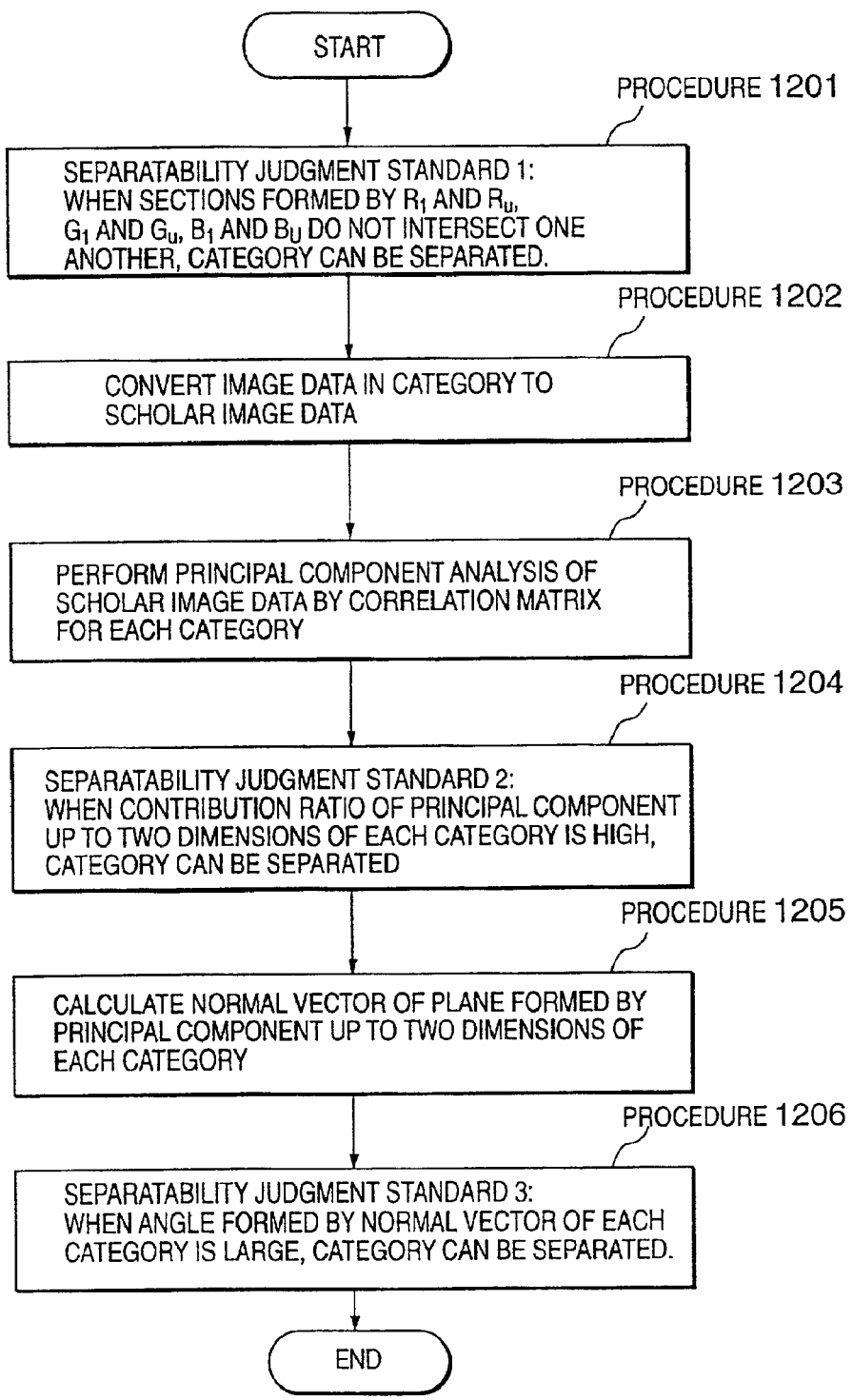
FIG. 12 is a flowchart showing a procedure for calculating separatability of the category according to the first embodiment.

When any one of these three is satisfied, the separatability of the categories is high. Additionally, the category is accurately judged, and estimate precision can be enhanced. A procedure for calculating the category separatability in the scholar RGB space will be described with reference to FIG. 12. In procedure 1201, first the separatability judgment standard 1 is checked, that is, it is judged whether the sections formed by the threshold values $R_1$ and $R_u$, $G_1$ and $G_u$, $B_1$ and $B_u$ do not intersect one another in the categories. Subsequently, the image data is converted to the scholar image data for each category in procedure 1202. In procedure 1203, the correlation matrix of the scholar image data is obtained for each category, and the correlation matrix is used to perform the principal component analysis. In procedure 1204, the second separatability judgment standard is checked. Concretely, as a result of the principal component analysis for each category, the contribution ratio up to (sensor band number-1) dimensions is calculated. When the contribution ratio is high, the category separatability is high. Subsequently, in procedure 1205, a principal component vector corresponding to a minimum inherent value of each category is obtained. This is because the principal component vector corresponding to the minimum inherent value among the principal component vectors is a normal vector of a plane formed by the principal component vectors of up to (sensor band number-1) dimensions. In procedure 1206, the angle formed by the normal vectors of each category as the third separatability judgment standard is obtained. When each normal vector is normalized, the angle can be obtained with an inner product. When the angle is large, the separatability is high. The aforementioned procedure is performed in the scholar RGB space, but the same operation may be performed in the spectral reflectance space or the base coefficient space of the spectral reflectance. Additionally, when the procedure is performed in the base coefficient space, the base function for use in each category needs to be naturally the same. Additionally, when the procedure is performed in the base coefficient space of the spectral reflectance, the correlation matrix for use in the procedure 1203 is equivalent to the correlation matrix $R_{RR}$ of the base coefficient in the equation 17.

Figure 13:
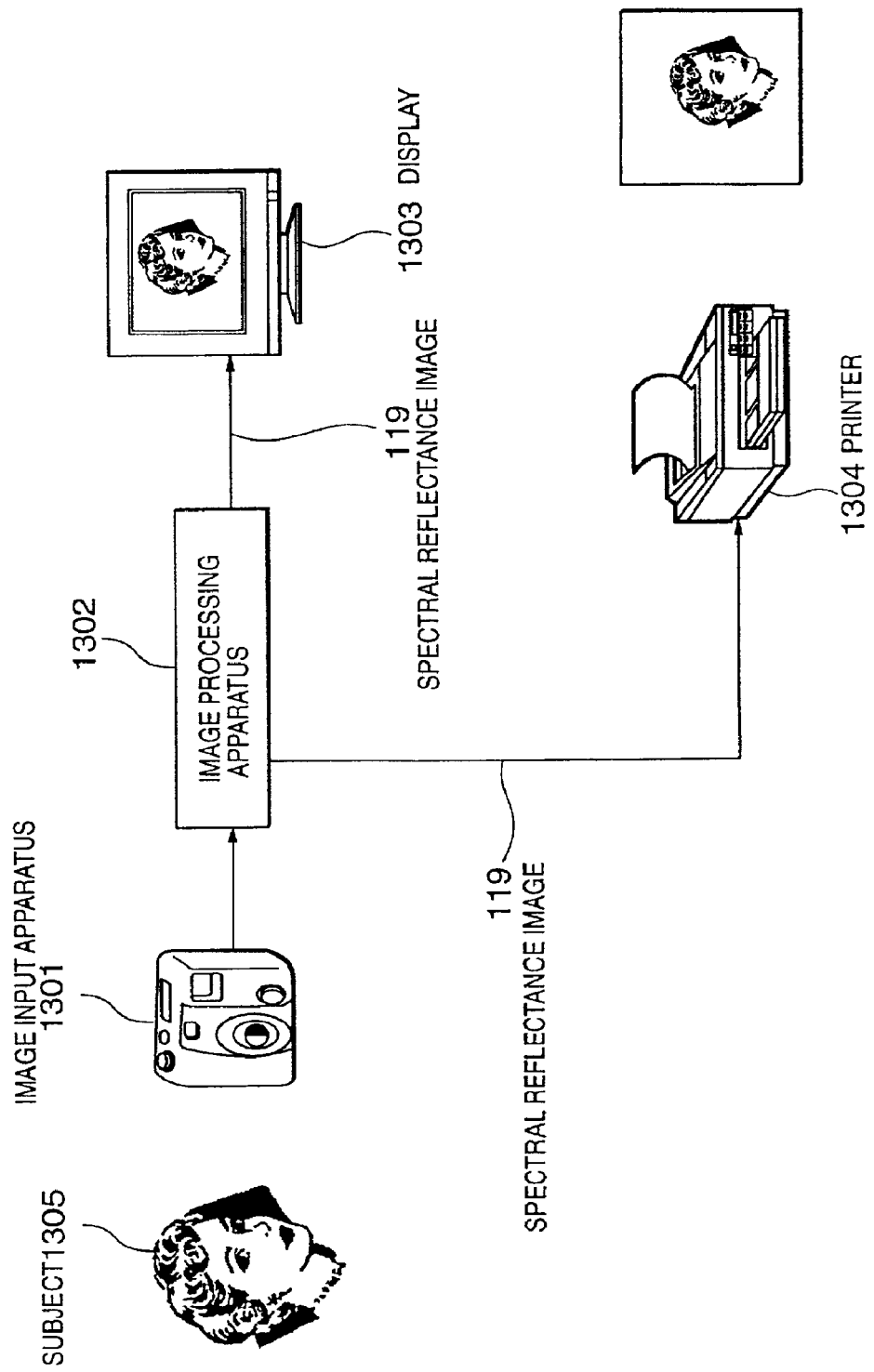
FIG. 13 is a constitution diagram showing a system application example of the image processing apparatus.

FIG. 13 shows a system application example of the image processing apparatus of FIG. 1. In FIG. 13, an image input apparatus 1301, image processing apparatus 1302, display 1303, and printer 1304 are shown. An image of subject 1304 is inputted via the image input apparatus 1301, and a spectral reflectance image 119 is outputted by a processing in the image processing apparatus 1302. The spectral reflectance image 119 is transferred to the display 1303 or the printer 1304, converted to a signal of each apparatus, and displayed on the display 1303, or outputted via the printer 1304. The spectral reflectance image 119 may be converted to the signal of each apparatus by an internal CPU of the display 1302 or the printer 1303, or by a separate personal computer or another image processing apparatus before transferred to the display 1302 or the printer 1303. Moreover, all processing of the image processing apparatus 1302 may be performed by the internal CPU of the image input apparatus 1301. In this system of FIG. 13, the inputted image is once converted to color data not dependent on the apparatus and/or the lighting, and converted to the signal of each output apparatus, so that a real color of the subject can be outputted to the display or the printer. When the obtained spectral reflectance image 119 is outputted to the display or the printer and observed by a person as in the application example, a pseudo contour is sometimes generated in each category region boundary. This is because the category of each pixel is judged and the spectral reflectance is estimated by the different method.

To solve the problem, the following method may be used. When each pixel is judged to belong to a certain category, as described above, the spectral reflectance data is estimated by the matrixes (equation 13) and (equation 15) prepared for the category, or the neural network. However, separately, the spectral reflectance data is estimated even in the estimating method (equation 12) of the case in which the pixel does not belong to any category. A result obtained by weighting the data by both estimating methods with the reliability with which the data belongs to the category may be obtained as final spectral reflectance data. The reliability with which the data belongs to the category is calculated, for example, by equation 19 or equation 20. In the equation 19, f(x) denotes the judgment function value of the category calculated in the procedure 601, g(x) denotes the Mahalanobis distance calculated in the procedure 701, and $g_{thre}$ is the threshold value of the Mahalanobis distance by the $\chi$ square distribution used in the procedure 704.

$$\text{weight }(x) = 1 - f(x) \tag{19}$$

$$weight(x) = \frac{g(x)}{g_{thre}} \tag{20}$$

The matrix prepared for the category (equation 13), spectral reflectance data $r_{category}(x)$ estimated by (equation 15) or the neural network, and estimate solution $r_{general}(x)$ by the equation 12 of the case in which the pixel does not belong to any category are combined in equation 21 by the obtained weight. The obtained r(x) is outputted as the final spectral reflectance data 115 to the image recording section 117.

$$r(x) = (1 - \text{weight}) \cdot r_{category}(x) - \text{weight} \cdot r_{general}(x) \tag{21}$$

Additionally, the image input section of RGB three bands has been described in the present embodiment. However, the present technique can similarly be applied even when filters RGB are further increased. Moreover, the image input section is not limited to the digital camera, and a scanner may be used, and an analog output may be digitized to obtain data. Furthermore, the present processing may be applied to each dynamic image. Additionally, in the present invention, the operation of the image processing apparatus in FIG. 1 is stored in CD-ROM, program stored in CD-ROM is downloaded in RAM on PC, and CPU on PC is allowed to perform a processing of color estimating means. Moreover, the operation is stored in ROM in the image input apparatus, and CPU in the image input apparatus is allowed to perform the processing of the means. In this case, the image data outputted from the image input apparatus is not a color space display inherent to the input apparatus, and is the image data of the color space not dependent on the apparatus and/or the fighting. Therefore, since it is unnecessary to install the color estimating means in the computer as in the prior art, even a general user not skillful in computer or color conversion can easily handle the image data. Additionally, when the RGB image data of the input apparatus can be acquired by changing a mode, a matching property with the conventional apparatus can advantageously be obtained.

As described above, according to the present embodiment, a plurality of sets of subjects as main constituting elements of the image inputted from the image input apparatus are set, and means for estimating the color data which is not dependent on the apparatus and/or the lighting is calculated beforehand for each set. Subsequently, it is judged whether or not each pixel of the image data inputted from the image input apparatus belongs to any set of the subjects, the estimating means is selected based on the judgment result to estimate the color data which is not dependent on the apparatus and/or the lighting, and the high-precision estimate can be performed.

(Second Embodiment)

In the first embodiment, the category to which each pixel belongs is judged using the statistical properties of the data belonging to the category, such as the average value and Mahalanobis distance. On the other hand, a second embodiment discloses a method of judging the category from a difference between the color which is converted assuming that the pixel belongs to a certain set and which is not dependent on the apparatus and/or the lighting, and a color which is converted assuming that the pixel does not to belong to any set and which is not dependent on the apparatus and/or the lighting.

Figure 14:
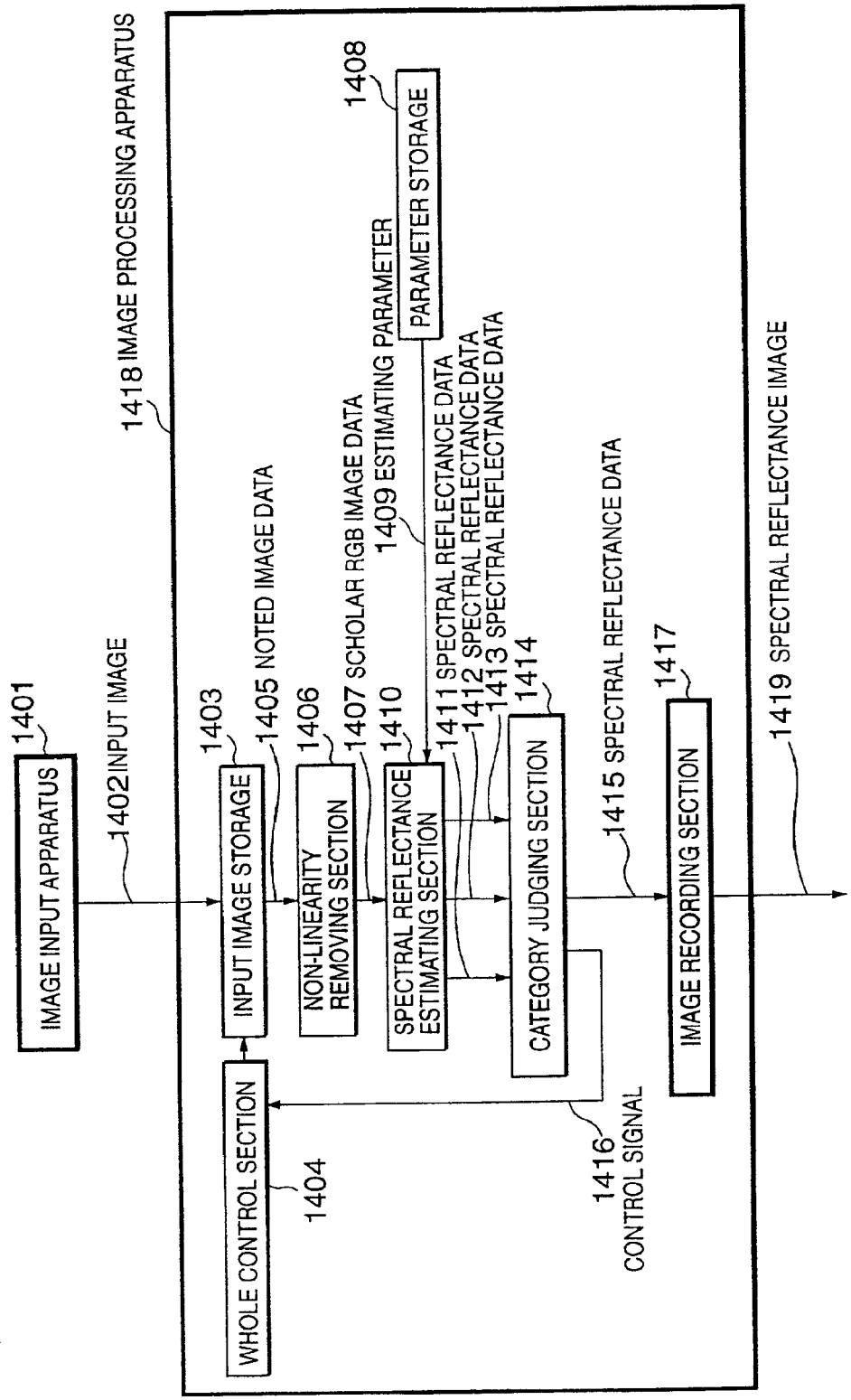
FIG. 14 is a block diagram of the image processing apparatus according to a second embodiment of the present invention.

FIG. 14 shows a block diagram of the image processing apparatus in the second embodiment of the present invention. In this example, the number of predetermined categories is two. FIG. 14 shows: an image input apparatus 1401 for acquiring image data of RGB three bands; an input image 1402; an input image storage 1403 for storing the input image 1402; a whole control section 1404 for processing/controlling each pixel of the input image 1402; noted image data 1405 as a pixel value of each pixel read from the input image storage 1403 in accordance with an instruction of the whole control section 1404; a non-linearity removing section 1406 for removing non-linearity from the noted image data 1405; image data 1407 (hereinafter referred to as scholar image data or scholar RGB image data) from which the obtained non-linearity is removed by the non-linearity removing section 1406; a parameter storage 1408 for storing the pre-calculated spectral reflectance estimating parameter of each category beforehand; an estimating parameter 1409 for use in estimating the spectral reflectance read from the parameter storage 1408; a spectral reflectance estimating section 1410 for using the estimating parameter 1409 to estimate the spectral reflectance; spectral reflectance data 1411 obtained by assuming that the noted image data 1405 belongs to the category 1 and estimating the spectral reflectance; spectral reflectance data 1412 obtained by assuming that the noted image data 105 belongs to the category 2 and estimating the spectral reflectance; spectral reflectance data 1413 obtained by assuming that the noted image data 1405 does not belong to either one of the categories 1 and 2 and estimating the spectral reflectance; a category judging section 1414 for judging the category to which the scholar image data 1407 belongs, and determining final spectral reflectance data 1415 from prospective values of the spectral reflectance data 1411, 1412, 1413; the spectral reflectance data 1415 determined by the category judging section 1414; a control signal 1416 indicating that the spectral reflectance estimate of the noted image data 1405 ends; an image recording section 1417 for recording the spectral reflectance data; an image processing apparatus 1418; and a spectral reflectance image 1419 outputted from the image processing apparatus 1418. Additionally, here, it is assumed that the noted image data 1405 belongs to the category 1 or 2, or does not belong to the category 1 or 2, and the spectral reflectance estimating section 1410 estimates three types of spectral reflectance data 1411, 1412, 1413.

An operation of the image processing apparatus of FIG. 14 will be described. The image 1402 inputted from the image input apparatus 1401 is stored in the input image storage 1403. Subsequently, the pixel value is successively read as the noted image data 1405 to the non-linearity removing section 1406 from the input image storage 1403 in accordance with an instruction of the whole control section 1404. The non-linearity removing section 1406 converts the noted image data 1405 to the scholar image data 1407. Subsequently, the spectral reflectance estimating section 1410 assumes that the noted image data 1405 belongs to the category 1 or 2, or does not belong to the category 1 or 2, and calculates three types of spectral reflectance data from the scholar image data 1407. The estimating parameter 1409 for use in this case is stored beforehand in the parameter storage 1408, and therefore read from the storage for use. The category judging section 1414 uses the obtained three types of spectral reflectance data to judge the category to which the noted image data 1405 belongs, and determines and outputs the final spectral reflectance data. The obtained spectral reflectance data 1415 is recorded in the image recording section 1417. When these series of processing end with respect to the noted-image data 1405, the category judging section 1414 outputs the control signal 1416 indicating the end of the processing to the whole control section 1404. On receiving the control signal 1416, the whole control section 1404 reads the image data as the next processing object as the noted image data 1405 from the input image storage 1403. This is repeated with respect to all the pixels of the input image 1402.

For the detailed operation of the respective components of the block diagram of FIG. 14, the operation of the non-linearity removing section 1406 is the same as the operation of the non-linearity removing section 106 in the first embodiment.

An operation of the spectral reflectance estimating section 1410 will be described. The spectral reflectance estimating section 114 estimates the spectral reflectance data by the estimating method, in which the category is specified, based on the predetermined category. On the other hand, in the second embodiment, three types of cases in which the noted image data belongs to the category 1 or 2, or does not belong to any category are assumed, and the spectral reflectance data for all these cases are estimated. This respect is different from the first embodiment. The concrete estimating method is the same as the method described in the first embodiment.

Figure 15:
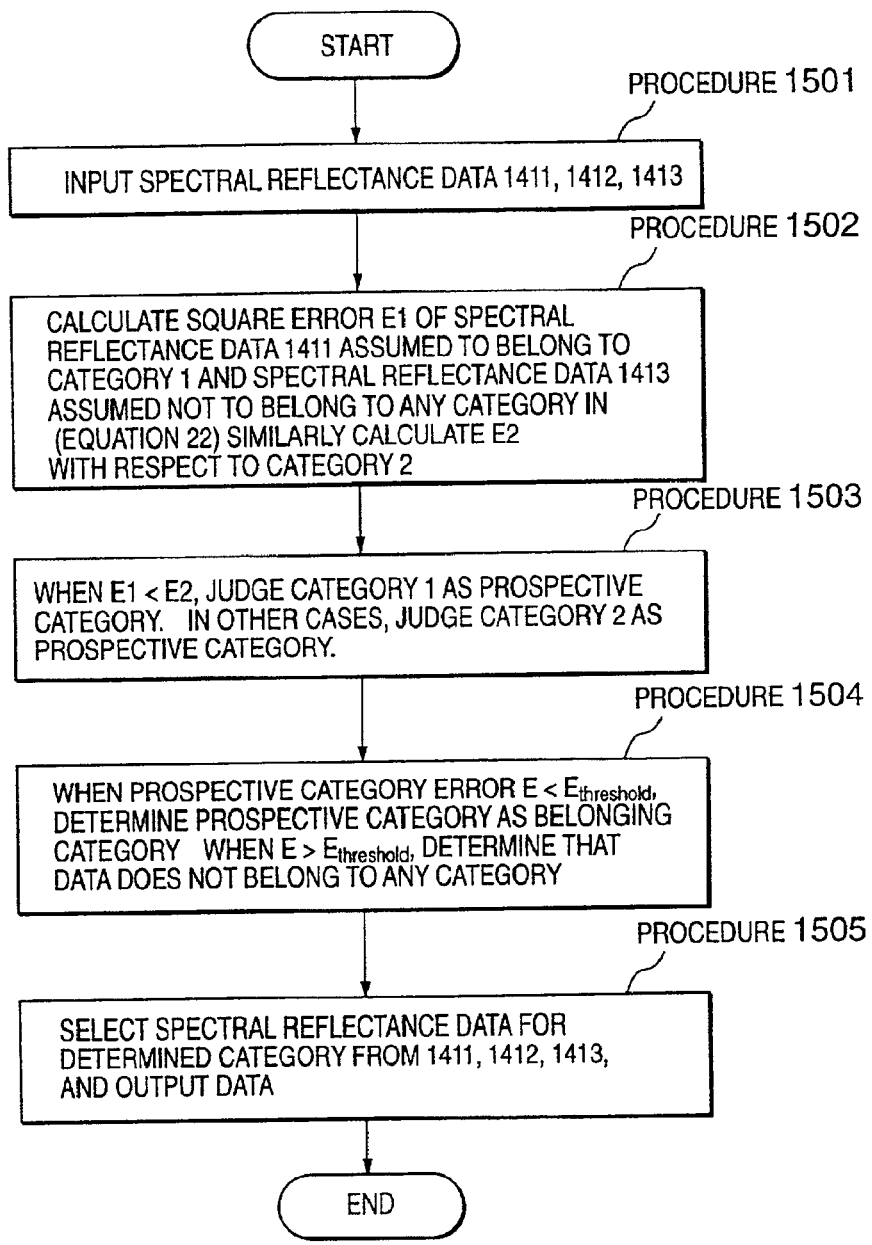
FIG. 15 is a flowchart showing a procedure for operating a category judging section 1414 according to the second embodiment.

Finally, a detailed operation of the category judging section 1414 as the characteristic of the present invention will be described. The spectral reflectance data obtained when the data is assumed to belong to the category 1 or 2 is obtained using the multiple regression analysis, neural network, and the like. When statistical information of data in the category is learned and estimated, and the noted image data 1405 really belongs to the category, an extremely good estimate result is obtained. However, when the data does not belong to the category, an extremely bad estimate result is obtained, and the difference is remarkable. On the other hand, when the data is assumed not to belong to any category, for the obtained spectral reflectance data, it is assumed that the spectral reflectance of the subject or the base coefficient is not correlated. That is, the data is estimated assuming that the correlation matrix is a unit matrix. Therefore, the precision is not bad or is not extremely good in the arbitrary scholar image data, and the estimate result with a middle degree of precision is obtained. The category judging section 1414 uses these properties of the estimate solution to judge the category. That is, a square error of the spectral reflectance data obtained assuming that the data belongs to each category, and the spectral reflectance data obtained assuming that the data does not belong to any category is obtained. It is then judged that the data belongs to the category having a smaller square error. A judging procedure in the category judging section 1414 is shown in FIG. 15. In procedure 1501, the spectral reflectance data 1411, 1412, 1413 in the case in which the noted image data belongs to the category 1 or 2, or does not belong to any category are inputted as prospective values to the category judging section 1414. In procedure 1502, a square error E1 of spectral reflectance data 1411$r_{category1}$ obtained assuming that the data belongs to the category 1, and spectral reflectance data 1413$r_{general}$ obtained assuming that the data does not belong to any category is obtained by equation 22. In equation 22, $r_{category1}(i)$ is a spectral reflectance with a wavelength i(nm) and, for example, a sum of errors between 400 nm and 700 nm is used to calculate the error by the equation 22.

$$E1 = \sqrt{\sum_{i=400}^{700}(r_{category1}(i) - r_{general}(i))^2} \quad (22)$$

A square error E2 of spectral reflectance data 1411 $r_{category2}$ obtained assuming that the data belongs to the category 2, and spectral reflectance data 1413 $r^{general}$ obtained assuming that the data does not belong to any category is also obtained similarly as the equation 22. Subsequently, in procedure 1503, it is judged that E1 or E2 is smaller, and the prospective category is judged with a smaller error. It is judged in procedure 1504 whether the error E of the prospective category is smaller than a predetermined threshold value $E_{threshold}$. With the error smaller than the threshold value, the prospective category is determined as the category to which the noted image data 1405 belongs. With the error larger than the threshold value, it is determined that the data does not belong to any category. In procedure 1505, the data belonging to the determined category is outputted as the final spectral reflectance data solution 1415 out of the prospective values of the spectral reflectance data 1411, 1412, 1413. The operation of the block diagram of the second embodiment has been described above.

Even in the present embodiment, the system application example similar to that of FIG. 13 of the first embodiment can be constituted. In this manner, when the spectral reflectance image obtained in the image processing apparatus of FIG. 2 is converted to a display or printer signal, and observed as the image, the pseudo contour is sometimes generated in the region boundary. This is because the respective categories are estimated in the different estimating methods, and therefore a data difference appears as the pseudo contour. To solve the problem, with each pixel judged to belong to the category 1 or 2, instead of using the estimated spectral reflectance data 1411 or 1412 as it is, the spectral reflectance data 1411 or 1412 of each category, and the spectral reflectance data 1413 estimated not to belong to any category are weighted in accordance with reliability with which the data belongs to the category, and may be obtained as the final spectral reflectance data. The reliability with which the data belongs to the category is calculated, for example, in equation 23. In equation 23, $E_{category}(x)$ is an error in the category to which noted image data x calculated in procedure 1502 belongs, and $E_{threshold}$ is a threshold value used in procedure 1504.

$$weight(x) = \frac{E_{category}(x)}{E_{Threshold}} \quad (23)$$

The spectral reflectance data $r_{category}(x)$ for the judged category, and the spectral reflectance data $r_{general}(X)$ not belonging to any category are combined in the equation 21 by the obtained weight weight(x). The obtained r(x) is outputted as the final spectral reflectance data 1415 to the image recording section 1417.

As described above, according to the present embodiment, a plurality of sets of subjects as main constituting elements of the image inputted from the image input apparatus are set, and means for estimating the color data which is not dependent on the apparatus and/or the lighting is calculated beforehand for each set. Subsequently, the set to which each pixel of the image data inputted from the image input apparatus belongs is judged by a difference of the color converted assuming that the data belongs to the certain set and not dependent on the apparatus and/or the lighting, and the color converted assuming that the data does not belong to any set and not dependent on the apparatus and/or the lighting. The color data which is not dependent on the apparatus and/or the lighting is determined based on the judgment result, and high-precision estimate can be performed.

(Third Embodiment)

Major constituting elements of the present embodiment are the same as those of the first embodiment shown in FIG. 1. The present embodiment is different from the first embodiment in the operation of the category judging section 108. In the first embodiment, the category to which each matrix belongs is judged using the statistical properties of the data belonging to the category, such as the average value and Mahalanobis distance. On the other hand, in the third embodiment, the belonging category is judged in accordance with the neural network.

A detailed operation of the category judging section 108 in the third embodiment will be described. The parameters such as the weight and threshold value of the neural network for use in category judgment need to be predetermined through learning before the operation of the image processing apparatus of FIG. 1.

Figure 16:
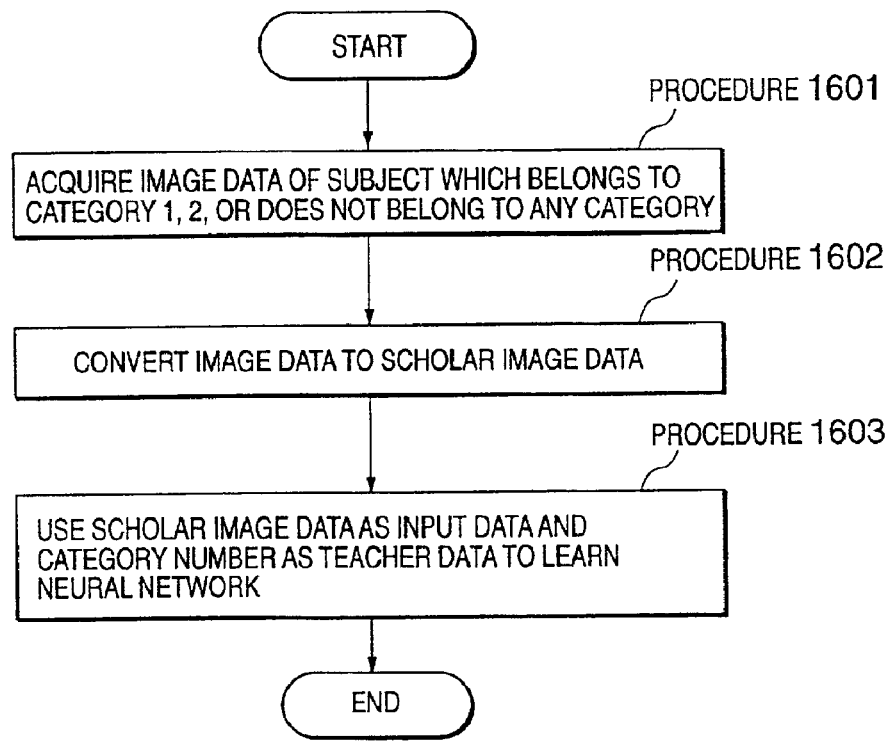
FIG. 16 is a flowchart showing the neural network learning procedure for judging the category according to a third embodiment of the present invention.

A learning procedure will be described with reference to FIG. 16.

Figure 17:
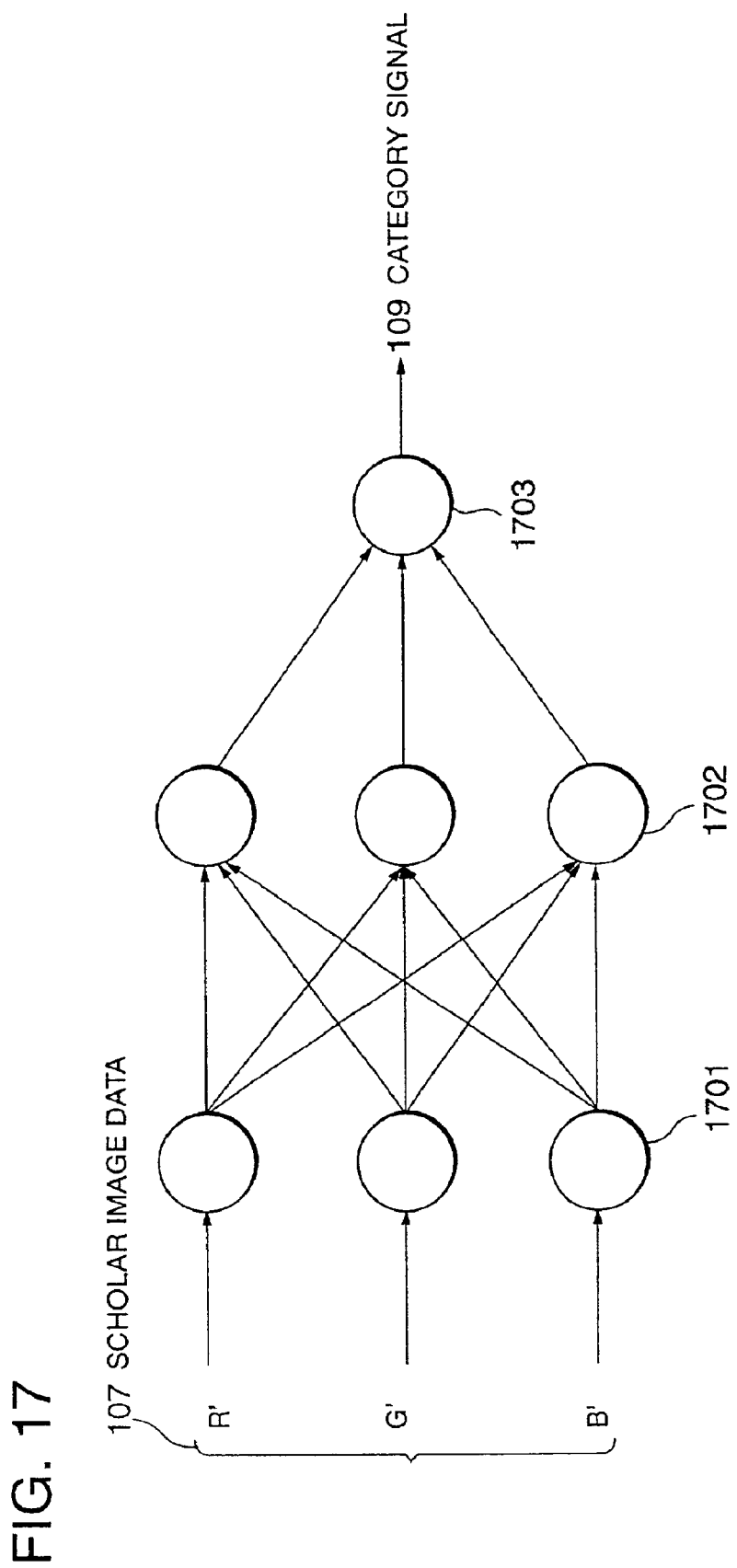
FIG. 17 is an explanatory view of the neural network for judging the category according to the third embodiment.

An example in which the number of categories is two will be described. First in procedure 1601, as many image data as possible which belong to the category 1, 2 or do not belong to any category are acquired. In procedure 1602, all the image data acquired in the procedure 1601 are converted to the scholar image data. In procedure 1603, all the scholar image data as the input data is learned by the neural network using the category number as teacher data. FIG. 17 shows a schematic view of the neural network in the third embodiment. The input data includes three-dimensional scholar image data, and output data includes one-dimensional data of the category number. On receiving the scholar image data 107 of the noted image data 105 from the non-linearity removing section 106, the category judging section 108 uses the neural network learned by the aforementioned procedure to estimate the category, and outputs the category signal 109.

As described above, according to the present embodiment, a plurality of sets of subjects as main constituting elements of the image inputted from the image input apparatus are set, and means for estimating the color data which is not dependent on the apparatus and/or the lighting is calculated beforehand for each set. Subsequently, it is judged by the neural network whether or not each pixel of the image data inputted from the image input apparatus belongs to any set of the subjects, and the estimating means is selected based on the judgment result to estimate the color data which is not dependent on the apparatus and/or the lighting. Therefore, the high-precision estimate can be performed.

(Fourth Embodiment)

In a fourth embodiment, as a system application example in which any image processing apparatus of the first to third embodiments is used, an example for using the image input apparatus as an apparatus for measuring a color temperature of a display will be described. That is, the subject of the camera is displayed. In order to measure the color temperature of the display, the exclusive-use calorimeter is generally used. However, since the calorimeter is expensive, it is difficult for a general use to purchase the calorimeter only for the purpose. Then, according to the image processing apparatus of the present invention, since the XYZ three stimulus values of the display can be calculated from the image signal of the digital camera, the apparatus can be used instead of the calorimeter.

Figure 18:
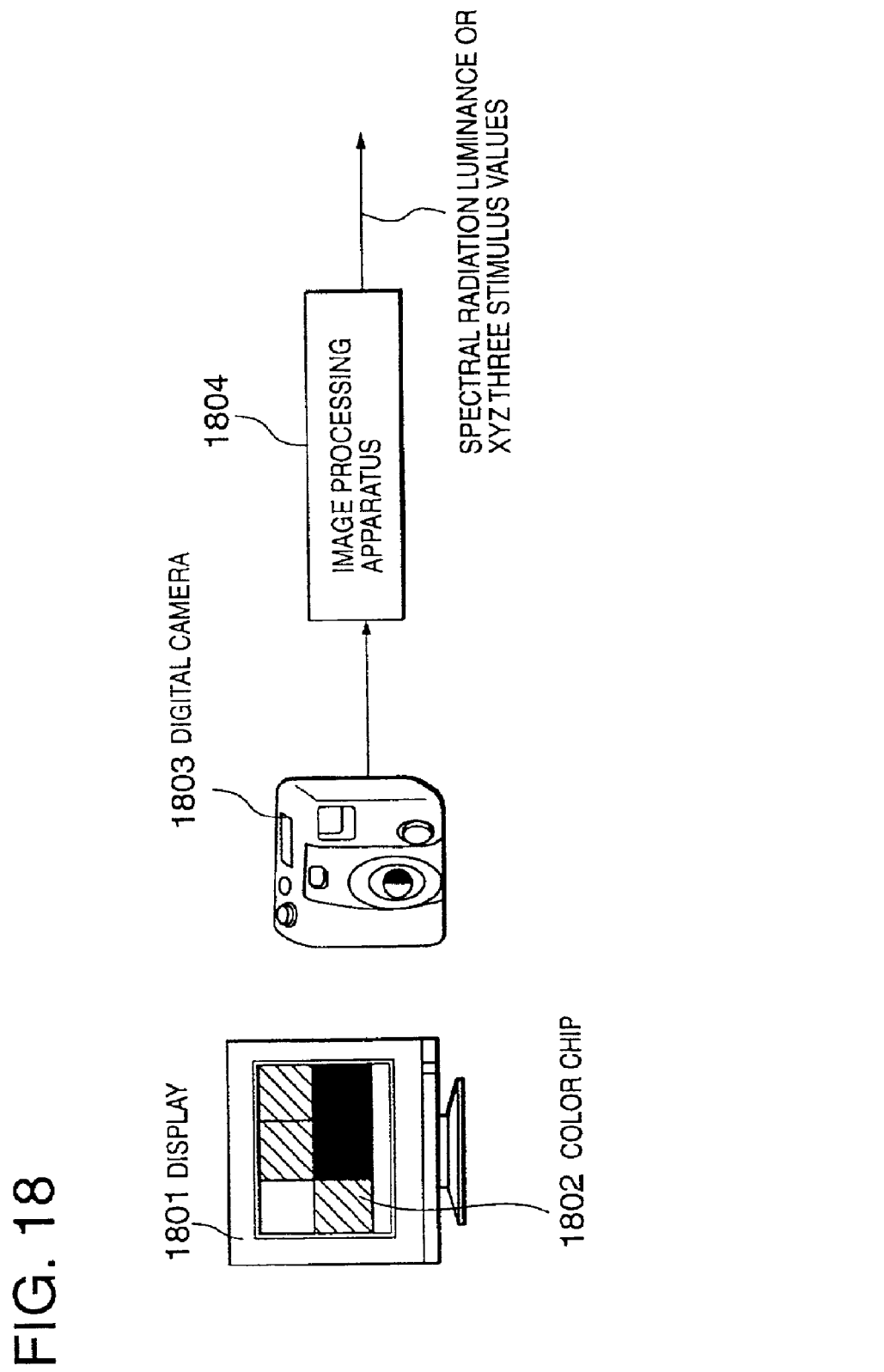
FIG. 18 is a diagram showing a substitute application example of a display calorimeter according to a fourth embodiment of the present invention.

An embodiment constituted as a system for measuring the color temperature of the display will be described. IN the system, the digital camera and the image processing apparatus of the present invention are used instead of the calorimeter. FIG. 18 is a diagram of the constitution. FIG. 18 shows a display 1801; a color chip 1802, disposed on the display 1801, for measuring the color temperature; a digital camera 1803; and an image processing apparatus 1804. The image processing apparatus 1804 is the same as the apparatus described in any one of the first to third embodiments. Moreover, for example, in a document 122-1996 "the Relationship between digital and colorimetric Data for Computer controlled CRT Display" issued by International Standardization Organization CIE, it is described that the display can be modeled with gray scale and XYZ three stimulus values during maximum emission of red, blue, green. Therefore, the color chip 1802 may be displayed in these colors on the display. Moreover, the image processing apparatus 1804 is stored, for example, in ROM of a personal computer, and operated by CPU on the personal computer.

Figure 10:
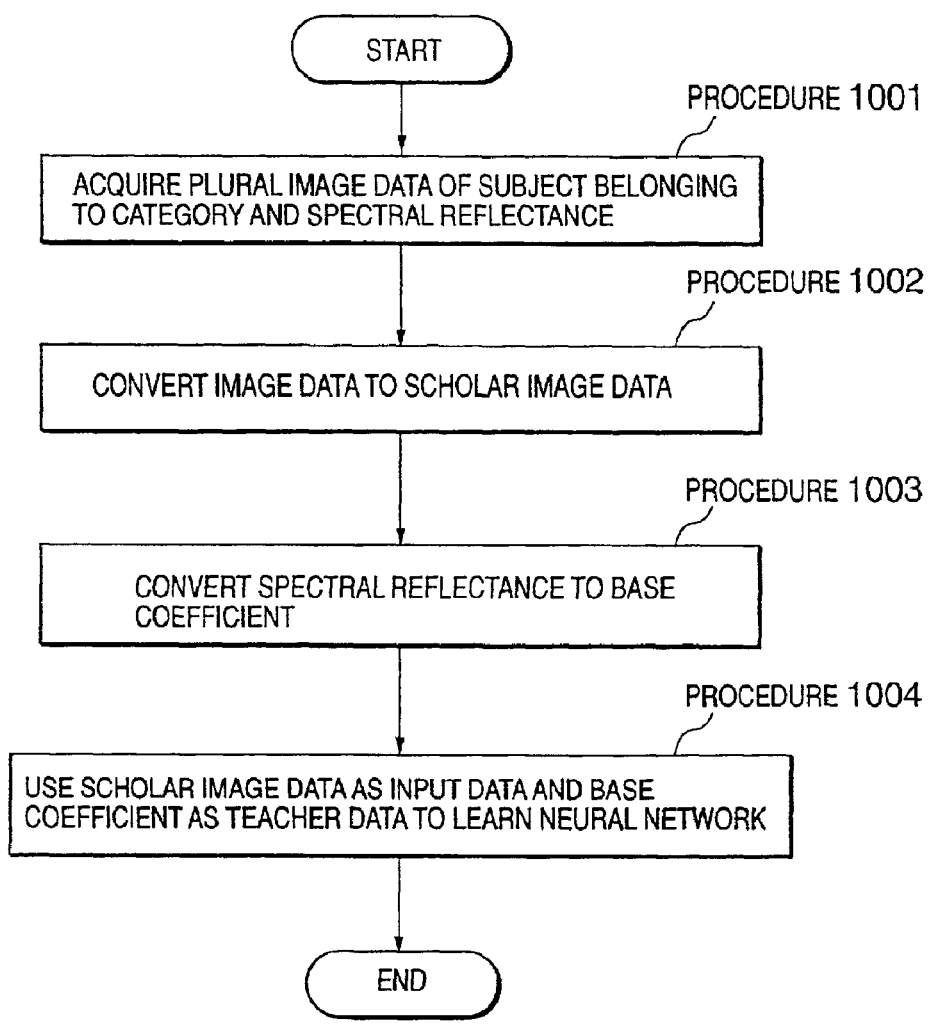
FIG. 10 is a flowchart showing the neural network learning procedure for estimating a category according to the first embodiment.
Figure 19:
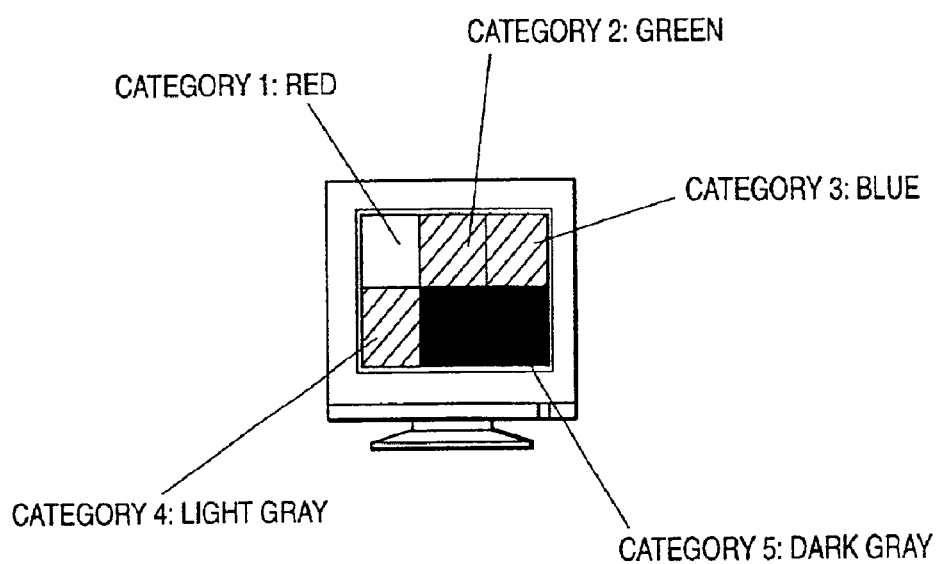
FIG. 19 is an explanatory view of category setting in the substitute application example of the display calorimeter according to the fourth embodiment.

First, the category to be set or prepared before operating the system of FIG. 18 will be described. In the fourth embodiment, five categories are to be preset: red; blue; green; light gray, and dark gray. The dark gray indicates gray with a display driving signal (0–255) which is not more than (50, 50, 50), and it is assumed that the light gray is other than the dark gray. FIG. 19 is an explanatory view of category setting in the display. Moreover, in order to determine the regression matrix or the neural network for use in estimating each category, the subject in the category acquired in the procedure 901 of FIG. 9 or the procedure 1001 of FIG. 10 is assumed to have respective colors when the color temperature of the display is changed a plurality of times. In an example of a red category, the subject for use in the procedure 901 or 1001 has 12 colors, when the driving signal of the display has a maximum red emission (255, 0, 0) during successive changing of the color temperature setting of the display every 500K from 4000K to 9500K. For the other categories, the data of the subject belonging to the category is similarly acquired. A procedure for determining the regression matrix or the neural network based on the data is the same as that of the first to third embodiments.

An operation of the system of FIG. 18 will next be described. The digital camera 1803 photographs the color chip 1802 on the display 1801. A plurality of color chips may be photographed once or a plurality of times. Moreover, an image signal of the obtained color chip 1802 is obtained. In any method of the first to third embodiments, the image processing apparatus 1804 calculates a spectral radiation luminance of each color chip. In the first to third embodiments, the spectral reflectance is calculated from the image signal, but an emission object such as the display does not have a concept of reflectance. Therefore, lighting is applied to the spectral reflectance of a usual reflective object, and the spectral radiation luminance is obtained as a component. Assuming that the spectral radiation luminance is $R'(\lambda)$, $R'(\lambda)$ can be represented by equation 24 using spectral reflectance $R(\lambda)$ and lighting spectral distribution $S(\lambda)$.

$$R'(\lambda)=R(\lambda)\cdot S(\lambda) \qquad (24)$$

Therefore, when the equation 24 is used to rewrite the equation 5, equation 25 results. When the spectral radiation luminance $R'(\lambda)$ is used instead of the spectral reflectance $R(\lambda)$ in the first to third embodiments, the spectral radiation luminance can be obtained in the same procedure. The spectral reflectance is the color data which is not dependent on the lighting and apparatus. On the other hand, the spectral radiation luminance is color data which is not dependent on the apparatus.

$$\begin{cases} R' = \int C_R(\lambda)R'(\lambda)d\lambda \\ G' = \int C_G(\lambda)R'(\lambda)d\lambda \\ B' = \int C_B(\lambda)R'(\lambda)d\lambda \end{cases} \qquad (25)$$

The image processing apparatus judges any one of the aforementioned five categories from the image signal of each color chip, and uses the estimate matrix or the neural network in the judged category to estimate the spectral radiation luminance $R'(\lambda)$. The obtained spectral radiation luminance is converted to the XYZ three stimulus values in equation 26. In the equation 26, $x(\lambda)$, $y(\lambda)$, $z(\lambda)$ are color matching functions determined by the Standardization Organization CIE.

$$\begin{cases} R' = \int x(\lambda)R'(\lambda)d\lambda \\ G' = \int y(\lambda)R'(\lambda)d\lambda \\ B' = \int z(\lambda)R'(\lambda)d\lambda \end{cases} \qquad (26)$$

Alternatively, instead of estimating the base coefficient of the spectral radiation luminance in each category and converting the luminance to the XYZ three stimulus values, the XYZ three stimulus values, not the base coefficient, may directly be estimated by the regression matrix. In this manner, according to the present invention, not only the spectral reflectance and the spectral radiation luminance, but also the XYZ three stimulus values can highly precisely be estimated in the same method.

As described above, according to the fourth embodiment, the subject of the image inputted from the image input apparatus is the display, and an object is to measure the color temperature of the display. Five sets of red, blue, green, light gray, and dark gray are set as the subject sets, and means for estimating the spectral radiation luminance as the color data which is not dependent on the apparatus for each set is calculated. Moreover, the subject set to which each pixel of the image data inputted from the image input apparatus belongs is judged, the estimating means is selected based on the judgment result, and the spectral radiation luminance as the color data which is not dependent on the apparatus is estimated. The color temperature of the display can highly precisely be estimated, and the digital camera can be used instead of the calorimeter.

(Fifth Embodiment)

In the first to fourth embodiments, the set to which each pixel of the input image belongs is judged in the color space of the input image. The input image color space is the color space dependent on the apparatus, and therefore it cannot be said that a color property of an object can accurately be reflected. Particularly, with the color conversion to the data which is not dependent on the data and/or the lighting, for example, with the conversion to the XYZ three stimulus values or the spectral reflectance, the set of the color can appropriately be defined for the color space of the data which is not dependent on the apparatus as the converted color space and/or the lighting.

In the present invention, during color conversion of each pixel of the image, the distribution in the converted color space of the specified object photographed beforehand in the image is learned beforehand for each set, and tentative color conversion is performed from the input image signal. The signal after the tentative color conversion is used to judge the set to which the pixel belongs in the converted color space, and each judged set is subjected to the different color conversion processing, so that judgment can securely be performed.

Details of a fifth embodiment of the present invention will be described. Here, similarly as the first embodiment, the digital camera having the output of RGB three bands is assumed as the most general image input system. The method of estimating the spectral reflectance of the object as the data which is not dependent on the apparatus and the lighting from RGB image data will be described. Moreover, to simplify the description, the case in which the number of categories is two will be described.

Figure 20:
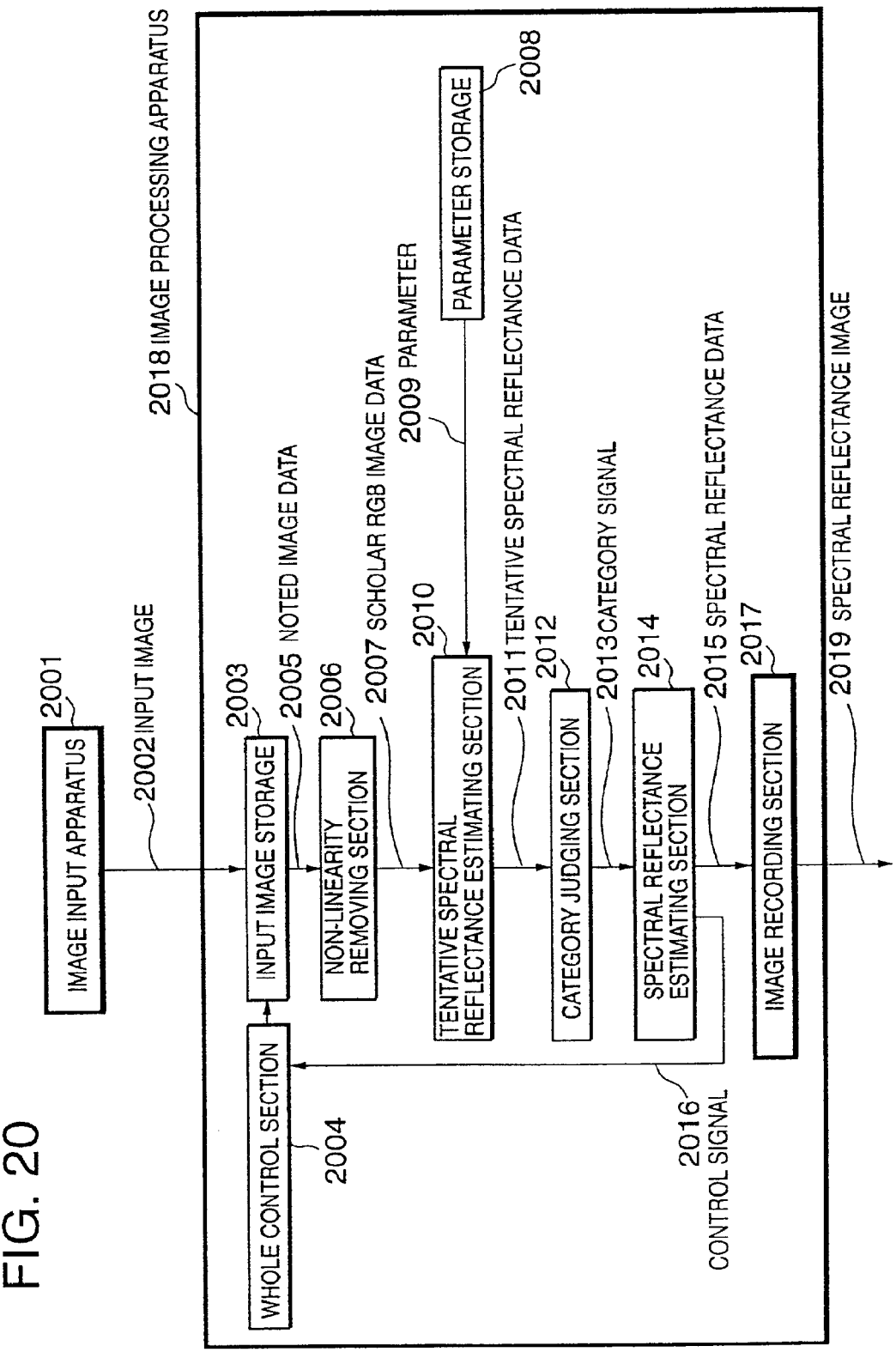
FIG. 20 is a block diagram of the image processing apparatus according to a fifth embodiment of the present invention.

FIG. 20 is a block diagram of the image processing apparatus for estimating the spectral reflectance image data from the RGB image data of the input apparatus according to the fifth embodiment. FIG. 20 shows: an image input apparatus 2001 for acquiring image data of RGB three bands; an input image 2002; an input image storage 2003 for storing the input image 2002; a whole control section 2004 for processing/controlling each pixel of the input image 2002; noted image data 2005 as the pixel value of each pixel read from the input image storage 2003 in accordance with an instruction of the whole control section 2004; a non-linearity removing section 2006 for removing the non-linearity from the noted image data 2005; image data 2007 (hereinafter referred to as the scholar image data or the scholar RGB image data) from which the obtained non-linearity is removed by the non-linearity removing section 2006; a parameter storage 2008 for storing a spectral reflectance parameter calculated beforehand for each category; a parameter 2009 for use in estimating the spectral reflectance read from the parameter storage 2008; a tentative spectral reflectance estimating section 2010 for using the parameter 2009 to estimate the tentative spectral reflectance; tentative spectral reflectance data 2011 estimated by the tentative spectral reflectance estimating section 2010; a category judging section 2012 for judging the belonging category in a spectral reflectance space from the tentative spectral reflectance data 2011; a category signal 2013 indicating that the data is judged to belong to the category 1 or 2, or not to belong to any category by the category judging section 2012; a spectral reflectance estimating section 2014 for using the parameter 2009 prepared for each category in response to the category signal 2013 to estimate the spectral reflectance; estimated spectral reflectance data 2015; a control signal 2016 indicating that the spectral reflectance estimate of the noted image data 2005 ends; an image recording section 2017 for recording the spectral reflectance data 2015; an image processing apparatus 2018; and a spectral reflectance image 2019 outputted from the image processing apparatus 2018. Additionally, the tentative spectral reflectance estimating section 2010 assumes that the noted image data 2005 does not belong to the category 1, 2, and estimates the spectral reflectance.

An operation of the image processing apparatus of FIG. 20 constituted as described above will be described. The image data 2002 inputted from the image input apparatus 2001 is stored in the input image storage 2003. Moreover, the pixel value is successively read as the noted image data 2005 to the non-linearity removing section 2006 from the input image storage 2003 in accordance with the instruction of the whole control section 2004. The non-linearity removing section 2006 converts the noted image data 2005 to the scholar image data 2007. Subsequently, the tentative spectral reflectance estimating section 2010 assumes that the noted image data 2005 does not belong to the category 1, 2, and calculates the spectral reflectance from the scholar image data 2007. Since the parameter 2009 for use in this case is stored beforehand in the parameter storage 2008, and therefore read for use. The category judging section 2012 uses the obtained tentative spectral reflectance (tentative spectral reflectance data 2011) to judge the category to which the noted image data 2005 belongs, and outputs the category signal 2013. The spectral reflectance estimating section 2014 uses the estimating parameter prepared for each category in response to the category signal 2013 to determine and output the final spectral reflectance data 2015. The obtained spectral reflectance data 2015 is recorded in the image recording section 2017. When these series of processing end with respect to the noted image data 2005, the category judging section 2012 outputs the control signal 2016 indicating the end of the processing to the whole control section 2004. On receiving the control signal 2016, the whole control section 2004 reads the image data as the next processing object as the noted image data 2005 from the input image storage 2003. This is repeated with respect to all the pixels of the input image 2002.

An example of the detailed operation of the non-linearity removing section 2006 will next be described. The processing in the non-linearity removing section 2006 may be performed by an electro-optical conversion function (EOCF function) determined, for example, by ISO17321 "Graphic Technology and Photography Color Characterization of Digital Still Cameras using Color Targets and Spectrum Illumination", or by using a multilayered perceptron or a regression matrix. Here, a non-linearity removing processing using the multilayered perceptron will be described.

The multilayered perceptron is a part of the neural network, the weight and threshold value as neuron parameters are learned beforehand, and the parameters obtained through the learning are used to estimate the reflectance. For the multilayered perceptron used herein, an input is image data, and an output is data obtained by removing non-linearity from the image data, that is, scholar image data.

A parameter learning procedure of the multilayered perceptron is the same as the procedure described with reference to FIG. 2 in the first embodiment. As shown in FIG. 3, when the spectral sensitivity property 302 of the image input apparatus 2001, the lighting property 303, and the spectral reflectance 301 of the color chip are given to the signal generation model, that is, the equation 5, the ideal image data 305 of the color chip is obtained.

Moreover, the estimating procedure of the weight and threshold value learned as described above by the neural network is the same as the procedure described above in the first embodiment. In the non-linearity removing section 2006, the noted image data 2005 is inputted to the learned neural network, and thereby the scholar image data 2007 is obtained in the output of the neural network.

The tentative spectral reflectance estimating section 2010 as the characteristic of the present invention will next be described. The tentative spectral reflectance is estimated by obtaining the spectral reflectance R(λ), when the scholar image data 2007 is assigned to the left side (R', G', B') of the equation 5. Since the scholar image data is in a linear relation with the spectral reflectance in the equation 5, the equation 5 is rewritten in the discrete matrix representation to obtain equation 10. Similarly as the aforementioned first embodiment, the equation 12 is obtained. In the equation 12, the matrix B is a matrix determined by the spectral sensitivity of the image input apparatus 2001, the spectral distribution of the lighting, and the base function.

The equation 12 obtained in this manner is ideally constituted of any object without particularly limiting the object. Moreover, since the matrix B is a square matrix, the unique solution can be obtained, and precision is substantially of the same degree for any object. It is therefore possible to use the matrix as the tentative spectral reflectance data.

A detailed operation of the category judging section 2012 as the characteristic of the present invention will next be described. The category constituted of the specified object is set before the image processing operation in FIG. 20. For the category, the object whose spectral reflectance is to be estimated with a particularly high precision may be set. For example, skin, grass green, and the like are considered to be important in color reproduction, and therefore the human skin as the category 1 and the grass green as the category 2 are set. After the category is set, the statistical property of each category is calculated.

Figure 21:
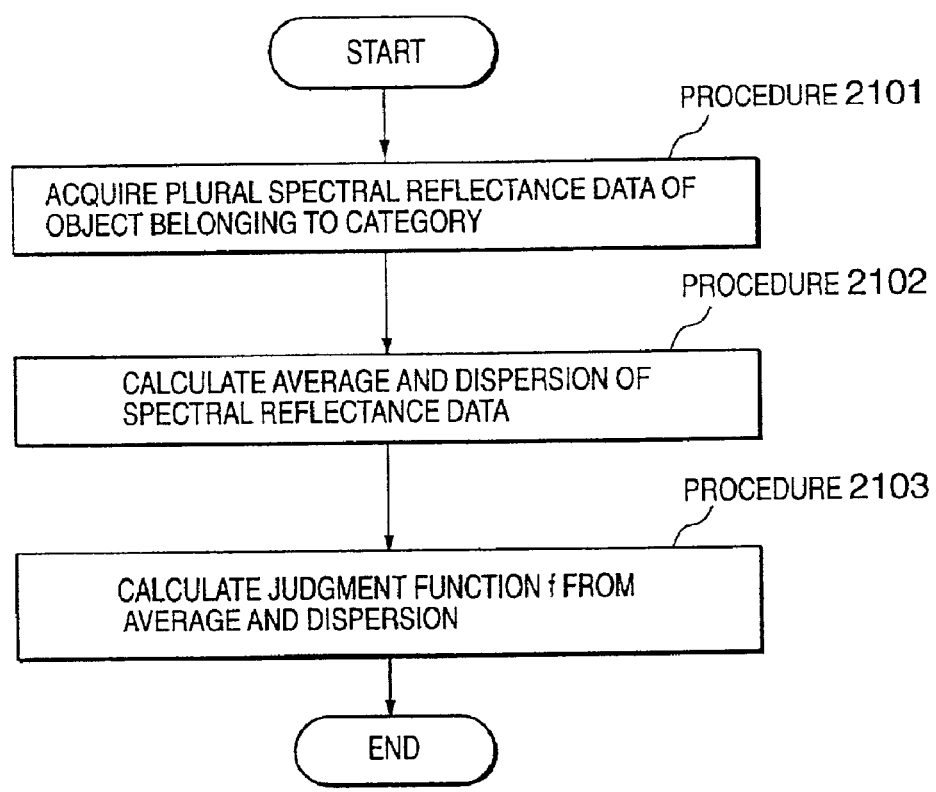
FIG. 21 is a flowchart showing a procedure for calculating the judgment function f according to the fifth embodiment.

A calculating procedure of the statistical property for each category will next be described with reference to FIG. 21. In procedure 2101, a plurality of spectral reflectance data of the object belonging to the category are acquired. For example, when the object is the skin, similarly as the first embodiment, as shown in FIG. 5, the skin may actually be inputted, or the color chip with the reflectance of the skin spectrally reproduced therein may be inputted. In procedure 2102, the average value and dispersion of the spectral reflectance data are calculated, and the obtained average value and dispersion are stored as the statistical property of the category. In procedure 2103, the judgment function is prepared.

The judgment function will be described. First, it is assumed that the data belonging to the category conforms to the normal distribution represented by the average and dispersion obtained in the procedure 2102. The equation of the normal distribution is represented as equation 27. When the spectral reflectance is set to be discrete, for example, in 31 dimensions every 10 nm from 400 nm to 700 nm, the equation is prepared for each wavelength, and a product is represented as the judgment function in equation 28.

$$f_i(x) = \exp\left\{-\frac{(x-\mu)^2}{2\sigma^2}\right\}, i = 1, \ldots, 31 \quad (27)$$

$$f(R_1, \ldots, R_{31}) = \prod_{i=1}^{31} f_i(R_i) \quad (28)$$

The judgment function is obtained for each category as described above.

Figure 22:
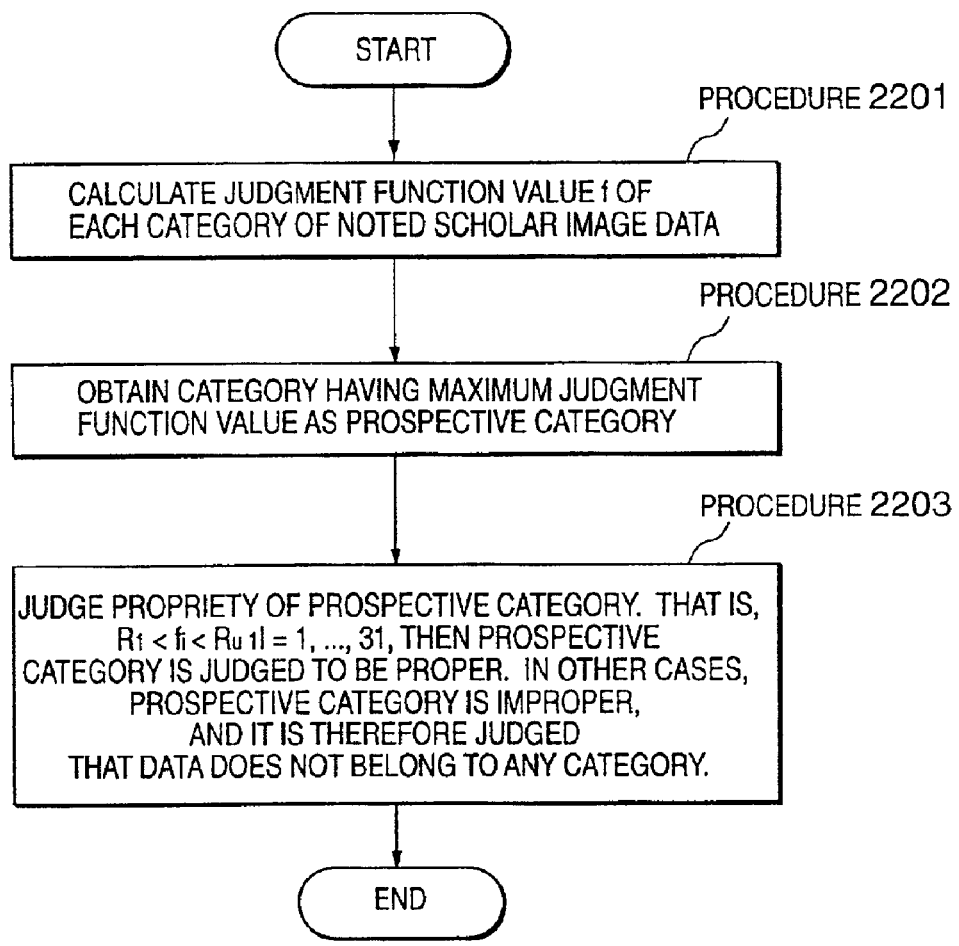
FIG. 22 is a flowchart showing the category judging procedure using the judgment function f according to the fifth embodiment.

An operation procedure of the category judging section 2012 performed using the judgment function obtained in the aforementioned procedure will next be described with reference to FIG. 22. In procedure 2201, the tentative spectral reflectance data is assigned to the judgment function of each category (equation 28) and the judgment function value is calculated. In procedure 2202, the category having a maximum judgment function value is obtained as the prospective category. In procedure 2203 it is judged whether the prospective category obtained in the procedure 2202 is proper. When the inputted tentative spectral reflectance data is close to the average value of the prospective category, the data is judged to be proper.

A concrete calculating procedure of the procedure 2203 will be described. First, in a normal distribution function $f_i(x)$ for each wavelength, for example, the value indicating the 80% reliability division is an upper limit threshold value $R_u$, and the value indicating the 20% reliability division is a lower limit threshold value $R_1$. The upper and lower threshold values are similarly calculated with respect to other wavelengths in this manner. When each wavelength of the inputted tentative spectral reflectance data is within the threshold value, the input pixel is judged to belong to the prospective category obtained in the procedure 2202. Outside the threshold value, it is judged that the pixel does not belong to any category. In the above category judging method, it is only judged whether the value is close to the average value indicated by the category in the space of the spectral reflectance. Therefore, the correlation of respective axes of the spectral reflectance space is not considered. When the correlation is considered, higher-precision category judgment is realized.

Furthermore, a method of using Mahalanobis distance as the judgment function of the category to highly precisely judge the category will be described. The Mahalanobis distance is defined in equation 29 similarly as the equation 8 shown in the first embodiment.

$$g(x)=(x-\mu)^t\Sigma^{-1}(x-\mu) \quad (29)$$

Additionally, in equation 29, Σ denotes a correlation matrix of the spectral reflectance data, μ denotes an average vector of the spectral reflectance data, and x denotes tentative spectral reflectance data to be judged. According to g(x) of the equation 29, the distance from the category of the inputted tentative spectral reflectance data x is normalized by the correlation matrix Σ, and therefore a judgment value with the correlation among the respective axes of the spectral reflectance space considered therein can be obtained.

Figure 23:
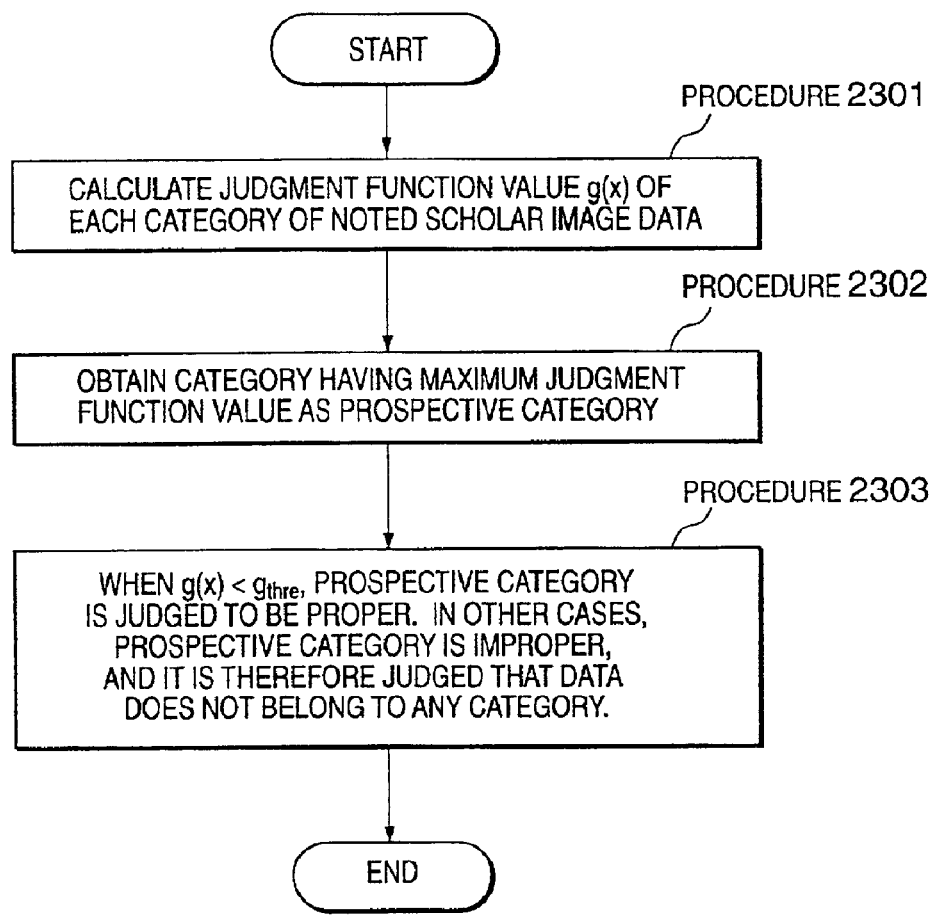
FIG. 23 is a flowchart showing the category judging procedure using a judgment function g according to the fifth embodiment.

An operation procedure performed by the category judging section 2012 using the aforementioned judgment function g(x) will be described with reference to FIG. 23. In procedure 2301, tentative spectral reflectance data is assigned to the judgment function g(x) (equation 29) of each category and the judgment function value is calculated. In procedure 2302, the category having the maximum judgment function value is obtained as the prospective category. In procedure 2303, propriety of the prospective category is judged by the Mahalanobis distance. In general, when x conforms to m-dimensional normal distribution, the Mahalanobis distance is known to conform to the χ square distribution with the freedom degree m. Then, the value indicating the 95% reliability division in the distribution function of the χ square distribution with the freedom degree m is obtained beforehand as $g_{thre}$. When g(x) is smaller than $g_{thre}$, the data is judged to belong to the prospective category. With a large value, it is judged that the data does not belong to any category. The operation of the category judging section 2012 has been described above.

There is a method of performing a further limited judgment by considering both "judgment using average"

(equation 28) and "Mahalanobis distance" (equation 29) which are the aforementioned two category judging methods. This method will be described. As a new judgment value with both judgments by equations 28 and 29 considered therein, h(x) of equation 30 is defined.

$$h(x) = \frac{f(x)}{g(x)} \quad (30)$$

In the equation 30, x denotes a tentative spectral reflectance data vector, and f(x) means a product of $f_i(x)$ shown in the equation 28 in all wavelengths. With a larger value of f(x), and with a smaller value of Mahalanobis distance g(x), a possibility that the data belongs to the category is higher. Therefore, with a larger value of h(x) of the equation 30, a possibility that the data belongs to the category is high, and both judgment standards of the equations 28 and 29 are considered in the value.

Figure 24:
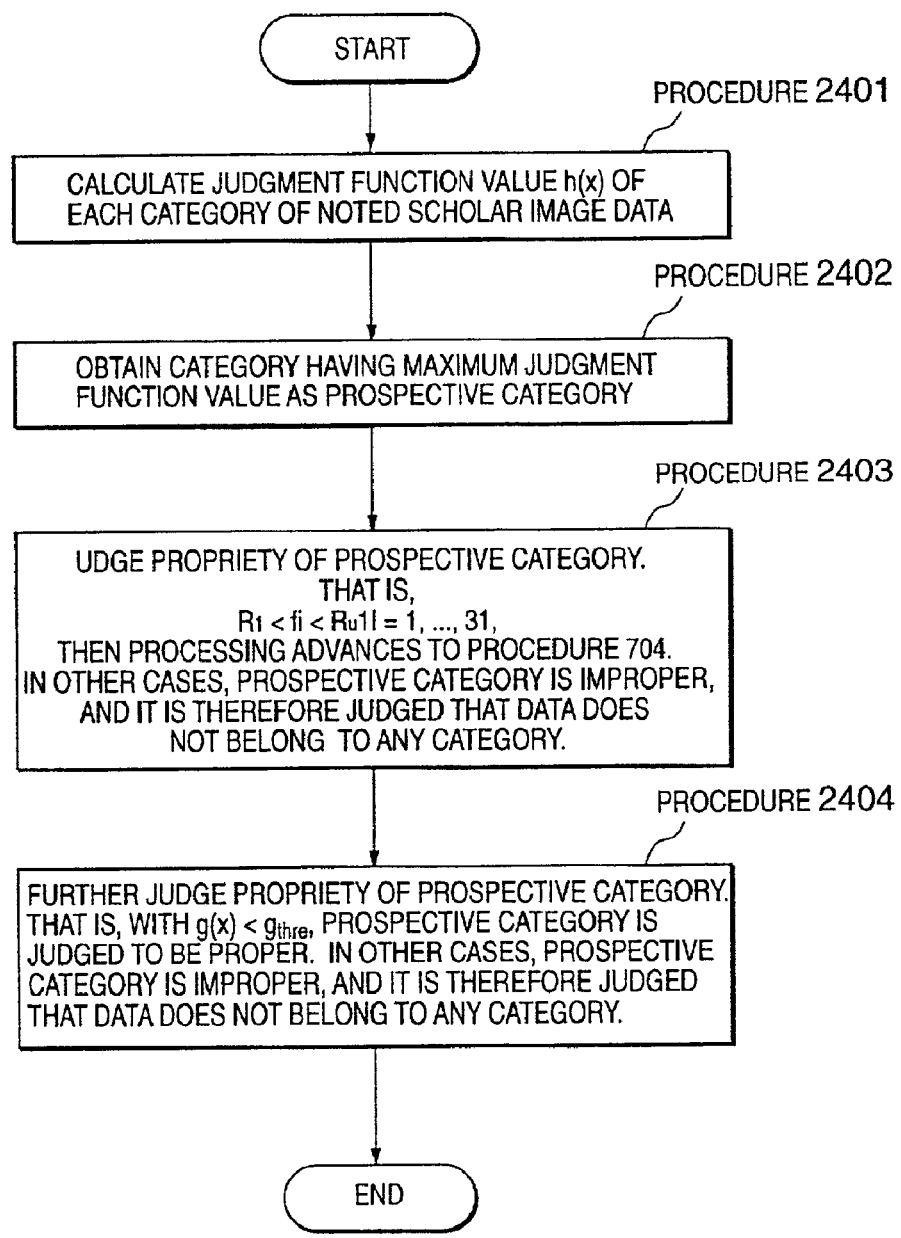
FIG. 24 is a flowchart showing the category judging procedure using a judgment function h according to the fifth embodiment.

An operation procedure of the category judging section 2012 using the aforementioned judgment function h(x) will be described with reference to FIG. 24. In procedure 2401, the tentative spectral reflectance data is assigned to the judgment function h(x) (equation 30) of each category and the judgment function value is calculated. In procedure 2402, the category having the maximum judgment function value is obtained as the prospective category. In procedure 2403, the threshold value is judged similarly as the procedure 2203. That is, when the respective wavelengths of the inputted tentative spectral reflectance data are within the upper and lower threshold values, the noted pixel is judged to possibly belong to the prospective category obtained in the procedure 2402, and the processing advances to procedure 2404. Outside the threshold value, it is judged that the data does not belong to any category. Subsequently, in the procedure 2404, the propriety of the prospective category is judged by the Mahalanobis distance. In general, when x conforms to the m-dimensional normal distribution, the Mahalanobis distance g(x) is known to conform to the $\chi$ square distribution with the freedom degree m. Then, the value indicating the 95% reliability division in the distribution function of the $\chi$ square distribution with the freedom degree m is obtained beforehand as $g_{thre}$. When g(x) is smaller than $g_{thre}$, the data is judged to belong to the prospective category. When the distance is larger, the data is judged not to belong to any category. The operation of the category judging section 2012 has been described above.

A detailed operation of the spectral reflectance estimating section 2014 as another characteristic of the present invention will next be described. During calculation of the tentative spectral reflectance data, the number of dimensions is reduced by the base function and the solution is obtained by an inverse matrix. However, the base function cannot represent all the objects with three dimensions, the equation is established on the assumption that the object is complete diffusion, further any noise is not considered, and therefore high-precision estimate is impossible. On the other hand, when the object is limited, as compared with solving of the aforementioned signal generation models (equation 5), (equation 10), a higher-precision solution can be obtained in the multiple regression analysis or neural network for estimating the reflectance from the statistical property of the image data regarding the object and spectral reflectance data. Additionally, in this case, extremely highly precise estimate can be realized with respect to the limited object, but the error becomes extremely large with respect to the other objects.

Therefore, in the present invention, with respect to the pixel judged to belong to the category, the estimating for the category using the multiple regression analysis, neural network, and the like is performed. When the pixel is judged not to belong to any category, the tentative spectral reflectance data is employed as the final solution as it is.

Figure 25:
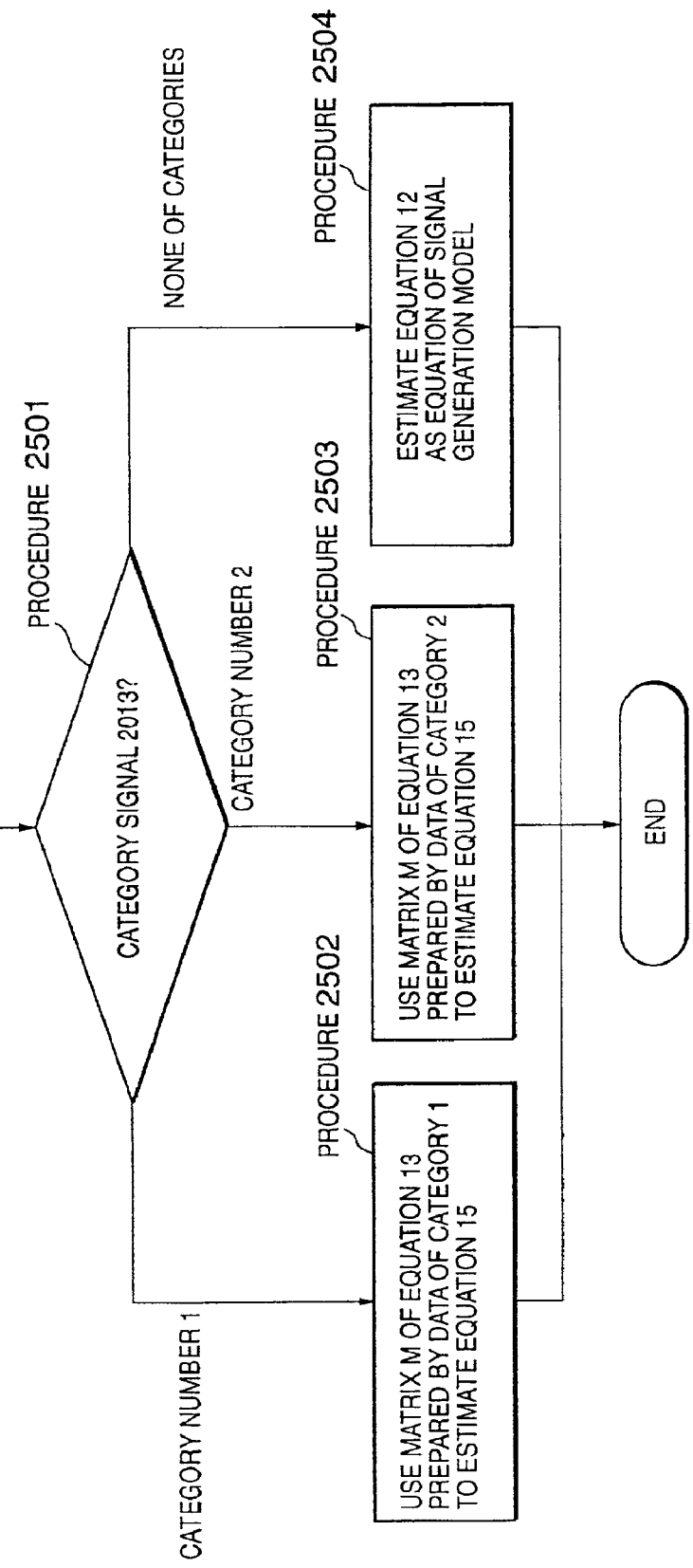
FIG. 25 is a flowchart showing the procedure for selecting the different estimating means by a category signal 2013 according to the fifth embodiment.

An explanatory of the present processing is shown in FIG. 25. In FIG. 25, the estimating method for use is changed with the category signal 2013 judged by the category judging section 2012 (procedure 2501). When the category signal 2013 belongs to the category 1 or 2, the estimate of the specified object by the multiple regression analysis or the neural network is performed (procedures 2502, 2503). When the signal does not belong to any category, the estimate is performed by the equation 12 (procedure 2504). In this case, the extremely high-precision estimate can be realized with respect to the object specified as the category, and a substantially satisfactory solution can be obtained with respect to other objects.

The estimating method for each category will next be described. A plurality of estimating methods for each category are considered. Here, two types of methods by multiple regression analysis and neural network will be described.

A procedure for estimating a base of the spectral reflectance from the scholar image data by the multiple regression analysis, re-constituting the spectral reflectance from the obtained base, and estimating the spectral reflectance is the same as the procedure described above with reference to FIG. 9 in the first embodiment. That is, as shown in FIG. 5, the procedure comprises obtaining a plurality of image data of the object belonging to the category from the image input section, using the calorimeter to obtain the spectral reflectance data beforehand, preparing the matrix (equation 13) for estimating the base coefficient of the spectral reflectance data from the image data by the multiple regression analysis, using the matrix M to estimate base coefficient $r=(a,b,c)^t$ of the spectral reflectance by the equation 15, and calculating the spectral reflectance from the obtained base coefficient.

On the other hand, instead of obtaining the base coefficient from the scholar image data and calculating the spectral reflectance, the spectral reflectance may directly be estimated by the multiple regression analysis. Since the multiple regression analysis is an estimating method based on the statistical property, it is also possible to estimate the data having dimensions more than the scholar image data (three dimensions) as the input. In this case, when the base coefficient vector is replaced with the spectral reflectance vector in the aforementioned procedure, and the base coefficient vector r is replaced with the spectral reflectance vector in the equation 15, the spectral reflectance can be estimated in the same manner. The method of preparing the estimating matrix for each category by the multiple regression analysis has been described above.

Moreover, the relation between the estimating matrixes (equation 13) and (equation 15) for each category, and the estimating matrix (equation 12) for use in judging that the data does not belong to any category is the same as the relation described with reference to the equations 12 to 14 in the first embodiment. Additionally, when the data does not belong to any category, the correlation matrix of the base coefficient is used as the unit matrix during estimating. That is, it has been described that the signal generation model solution of the equation 12 is used as the estimating solution. In addition to the estimating by the completely non-correlated matrix, that is, the unit matrix, a broad range of data of correlation matrix with a plurality of categories integrated therein may be used during estimating. With a broader range of data, the correlation matrix approaches the unit matrix. However, the breadth of the range of the data differs with the image as the object.

Furthermore, a procedure of learning neural network as another estimating method of each category is the same as the procedure described with reference to FIG. 10 in the first embodiment. That is, as shown in FIG. 5, the procedure comprises a plurality of image data of the object belonging to the category from the image input section, using the calorimeter to obtain the spectral reflectance data beforehand, learning the threshold value and weight of the neural network for estimating the base coefficient of the spectral reflectance from the scholar image data, and calculating the spectral reflectance from the spectral reflectance base coefficient obtained by inputting the arbitrary scholar image data to the neural network having the threshold value and weight obtained by the learning.

On the other hand, instead of obtaining the base coefficient from the scholar image data and calculating the spectral reflectance, the spectral reflectance may directly be estimated by the neural network. In the neural network, it is also possible to estimate the data having dimensions more than three dimensions of the scholar image data as the input. In this case, when the base coefficient vector in the aforementioned procedure is replaced with the spectral reflectance vector, the spectral reflectance can be estimated in the same manner. Moreover, it has been described that the neural network is used in estimating the spectral reflectance in the category. However, when the data does not belong to any category, the spectral reflectance can also be estimated in the neural network learned using a broad range of data with a plurality of categories integrated therein.

Additionally, the spectral reflectance space is used to judge the category as described above, but the category judgment may be performed by the base coefficient space instead of the spectral reflectance space. In this case, the tentative base coefficient is first obtained as the tentative base coefficient estimating section instead of the tentative spectral reflectance estimating section 12010. Moreover, the tentative base coefficient data is inputted to the category judging section 2012. The category is defined by f(x) of the equation 28, g(x) of the equation 29, or h(x) of the equation 30 in the base coefficient space. When the tentative base coefficient data is inputted as x of any function, the category with the data belonging thereto is judged. Moreover, the converted color data has been described as the spectral reflectance. Even when the data is converted to the XYZ three stimulus values instead of the spectral reflectance, the similar method can be applied. When the input image is to be converted to the XYZ three stimulus values, the category judgment in the XYZ three stimulus values space may be performed instead of the aforementioned category judgment in the base coefficient space. That is, after the tentative XYZ three stimulus values are first obtained from the input image, the category is judged in the XYZ three stimulus values space. The operation of each component of the image processing apparatus of FIG. 20 has been described above.

Moreover, similarly as the first embodiment, the image processing apparatus of FIG. 20 can be applied to the system shown in FIG. 13. In the system of FIG. 13, the inputted image is once converted to the color data which is not dependent on the apparatus and/or the lighting, and then converted to the signal of each output apparatus. Therefore, the real color of the object can be outputted to the display 1303 or the printer 1304.

Furthermore, as in this application example, the obtained spectral reflectance image 2019 is outputted to the display 1303 or the printer 1304, and observed by the person. In this case, there is a problem that a pseudo contour is sometimes generated in the boundary of the region of each category. This problem can also be solved by the method described with reference to the (equation 18) to (equation 20) in the first embodiment.

Additionally, in the above description of the embodiments, the converted color data is the spectral reflectance, but the XYZ three stimulus values may directly be estimated from the input image. In this case, the spectral reflectance in the above description, the spectral reflectance may be replaced with the XYZ three stimulus values as it is.

Moreover, in the present embodiment, the image input section of the RGB three bands has been described. Even when filters RGB are increased, the present method can similarly be applied. Furthermore, the image input section is not limited to the digital camera, and may be a scanner, or data constituted by digitizing the analog output. Additionally, the present processing may be applied to each dynamic image.

Furthermore, in the present invention, the operation of the image processing apparatus in FIG. 20 is stored in CD-ROM, the program stored in CD-ROM is downloaded in RAM on PC, and CPU on PC is allowed to perform the processing of color estimating means. Moreover, the operation is stored in ROM in the image input apparatus, and CPU in the image input apparatus is allowed to perform the processing of the means. In this case, the image data outputted from the image input apparatus is not a color space display inherent to the input apparatus, and is the image data of the color space which is not dependent on the apparatus and/or the lighting. Therefore, since it is unnecessary to install the color estimating means in the computer as in the prior art, even a general user not skillful in computer or color conversion can easily handle the image data. Additionally, when the RGB image data of the input apparatus can be acquired by changing a mode, the matching property with the conventional apparatus can advantageously be obtained.

As described above, according to the present embodiment, during color conversion of each pixel of the image, the distribution of the specified object photographed beforehand in the image in the converted color space is learned beforehand for each set. The input image signal is subjected to tentative color conversion, the signal after the tentative color conversion is used to judge the set to which the signal belongs in the color space after the conversion, and thereby the judgment can securely be performed. Furthermore, the different color conversion processing is applied to each judged set, and the color conversion can highly precisely be performed.

(Sixth Embodiment)

Major constituting elements of a sixth embodiment are the same as those of the fifth embodiment shown in FIG. 20. The present embodiment is different from the fifth embodiment in the operation of the category judging section 2012. In the fifth embodiment, the category to which each pixel belongs is judged by the statistical properties of the data belonging to the category, such as the average value and Mahalanobis distance. On the other hand, in the sixth embodiment, the belonging category is judged by the neural network.

Figure 26:
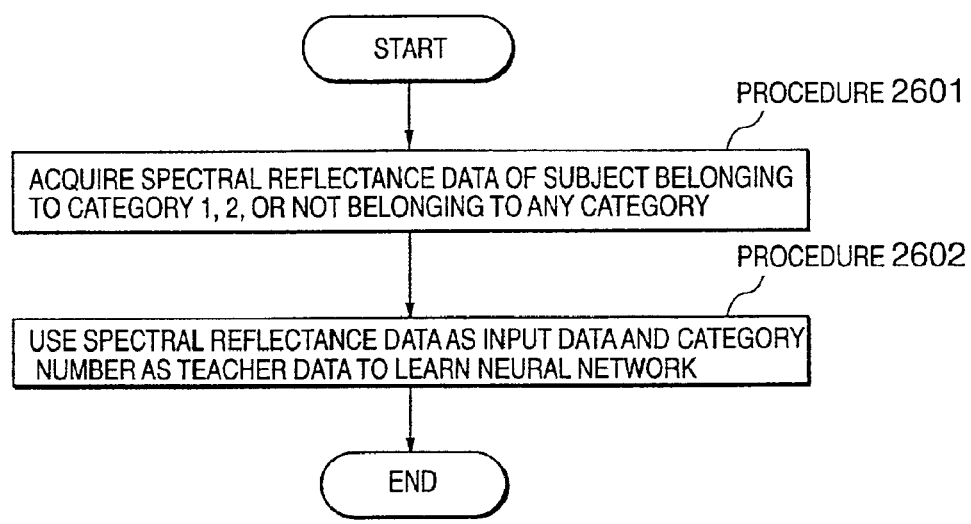
FIG. 26 is a flowchart showing the neural network learning procedure for judging the category according to a sixth embodiment of the present invention.

A detailed operation of the category judging section 2012 in the sixth embodiment will be described. It is necessary to determine the parameters for use in judging the category, such as the weight and threshold value of the neural network through learning before operation of the image processing apparatus of FIG. 20. A learning procedure will be described with reference to FIG. 26. The example in which the number of categories is two will be described. In procedure 2601, first the spectral reflectance data of the object belonging to the category 1, 2 and not belonging to any category are obtained as many as possible. In procedure 2602, all the spectral reflectance data as the input data and the category number as the teacher data are used to learn the neural network.

Figure 27:
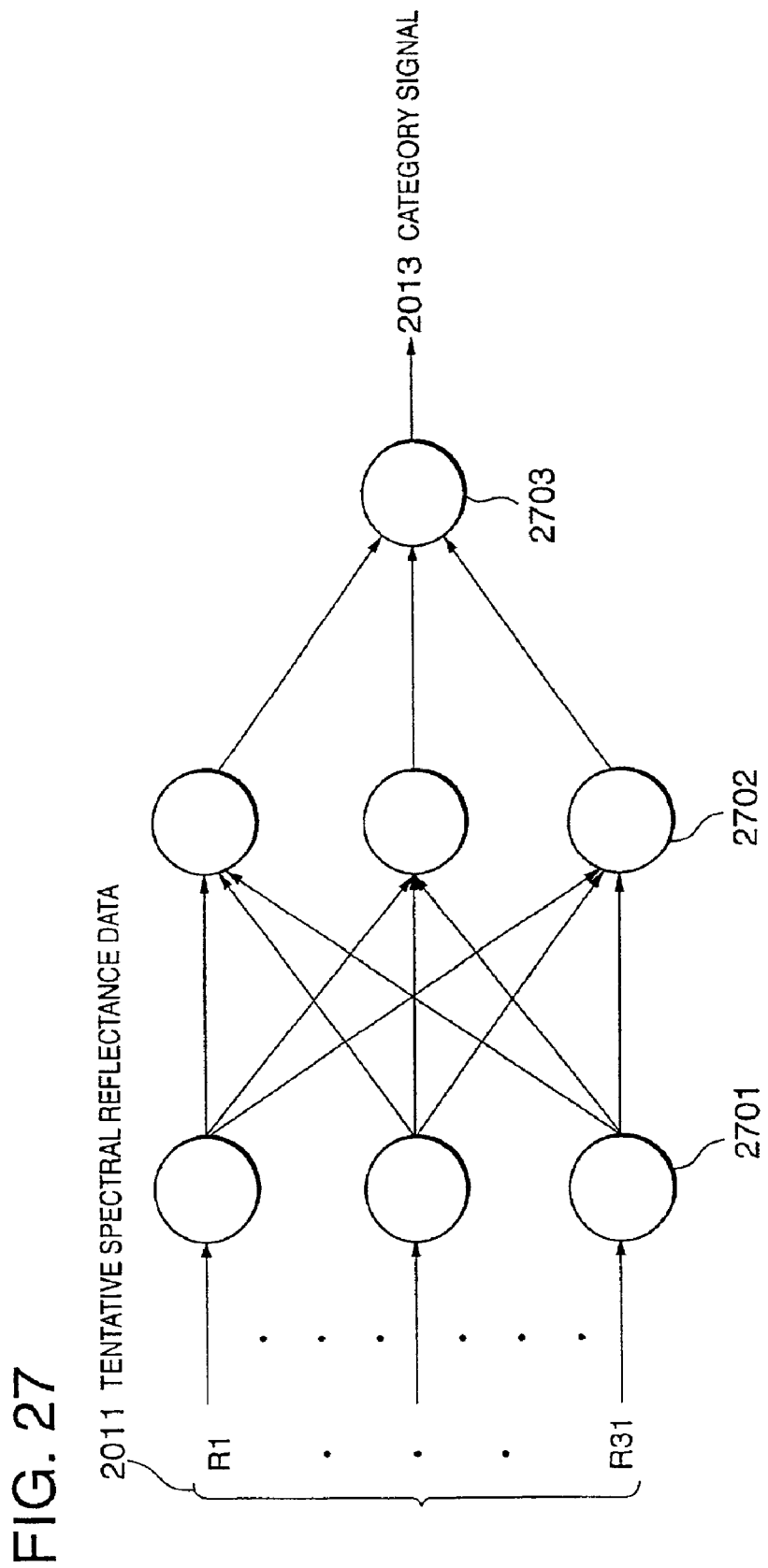
FIG. 27 is an explanatory view of the neural network for judging the category according to the sixth embodiment.

FIG. 27 shows a schematic view of the neural network in the present embodiment. The input data is 31-dimensional spectral reflectance data, and the output data is one-dimensional category number data. On receiving the tentative spectral reflectance data 2011 of the noted image data 2005 from the tentative spectral reflectance estimating section 2010, the category judging section 2012 uses the neural network learned by the aforementioned procedure to estimate the category, and outputs the category signal 2013. Additionally, in the present embodiment, the method for judging the category in the spectral reflectance space has been disclosed, but the category may be judged in the base coefficient space of the spectral reflectance instead of the spectral reflectance space. In this case, the spectral reflectance in the above description may all be replaced with the spectral reflectance base coefficient. Moreover, in the present embodiment, the spectral reflectance is obtained through the color conversion, but instead, the XYZ three stimulus values may be obtained. In this case, instead of the tentative spectral reflectance data, the tentative XYZ three stimulus values may be obtained, so that the category is judged from the tentative XYZ three stimulus values.

As described above, according to the present embodiment, during the color conversion of each pixel of the image, the distribution of the specified object photographed beforehand in the image in the color space after the conversion is learned beforehand through the neural network. The input image signal is subjected to tentative color conversion, the signal after the tentative color conversion is used to judge the set to which the signal belongs by the neural network whose input is the color space after the conversion, and thereby the judgment can securely be performed. Furthermore, the different color conversion processing is applied to each judged set, and the color conversion can highly precisely be performed.

(Seventh Embodiment)

In the fifth and sixth embodiments, the method of using the statistical property, neural network, and the like to automatically judge the category to which the color of each pixel belongs has been disclosed. On the other hand, in a seventh embodiment, a method in which a user designates the category judgment in an interactive manner will be described. Thereby, the category to which the color of each pixel belongs is further securely designated, and high-precision color conversion can be performed.

Figure 28:
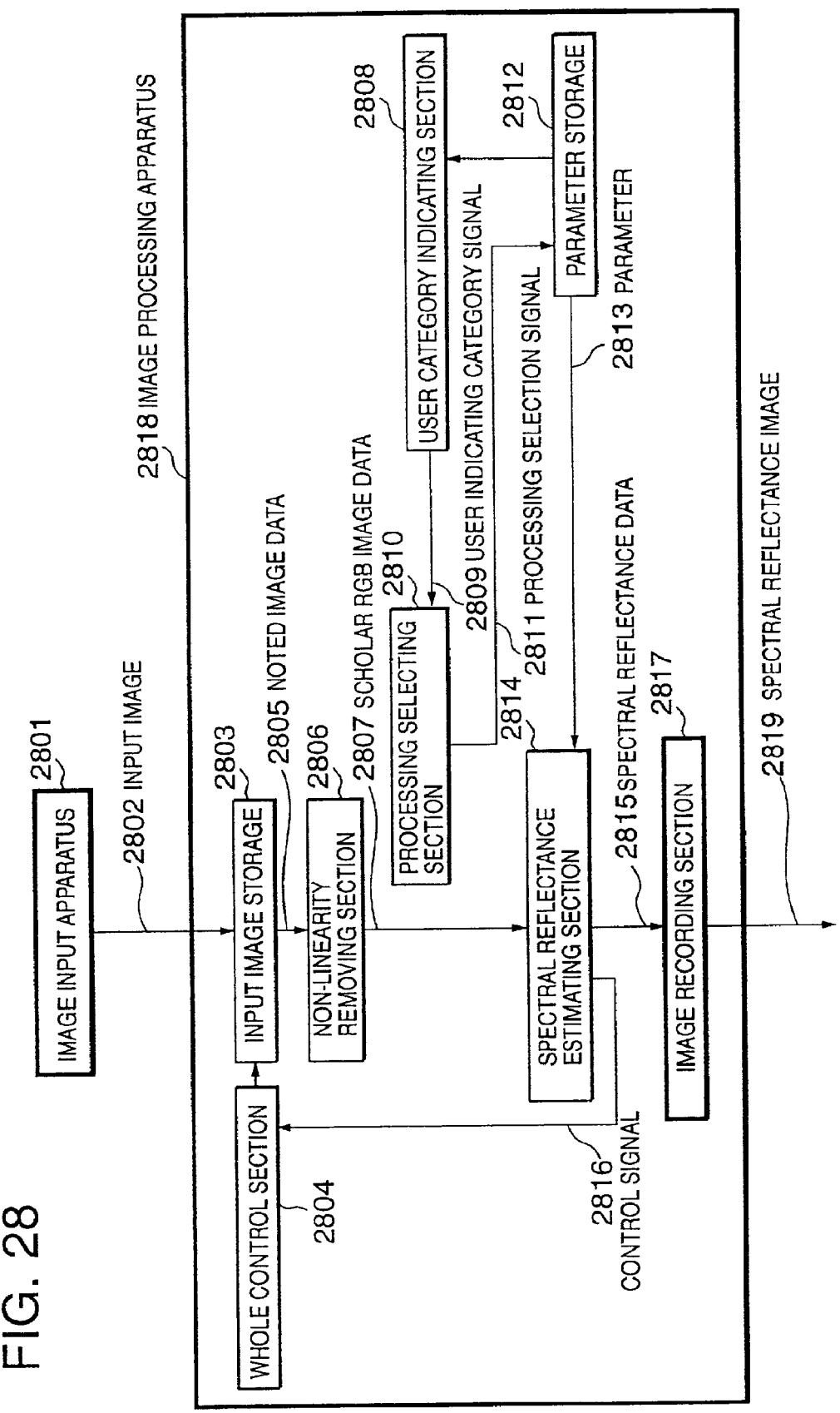
FIG. 28 is a block diagram showing the image processing apparatus according to a seventh embodiment of the present invention.

FIG. 28 is a block diagram of the image processing apparatus according to a seventh embodiment. Components have constitutions similar to those of the respective components in the fifth embodiment except a user category indicating section 2808 and user indicating category signal 2809. Additionally, means having the same names as those of the means shown in the fifth embodiment (FIG. 20) have the same functions. The category is prepared beforehand as the database, and stored in a parameter storage 2812. For example, when a clothes image is processed, cloth having various materials and hues is an object, and a plurality of categories are prepared as the database. Subsequently, the user indicates the category to be applied to each object in the input image from the categories stored in the parameter storage 2812 via the user category indicating section 2808. A spectral reflectance estimating section 2814 uses a parameter prepared for the category to estimate the spectral reflectance in response to the inputted user indicating category signal 2809. A concrete estimating method is similar to the method disclosed in the fifth embodiment.

Figure 29:
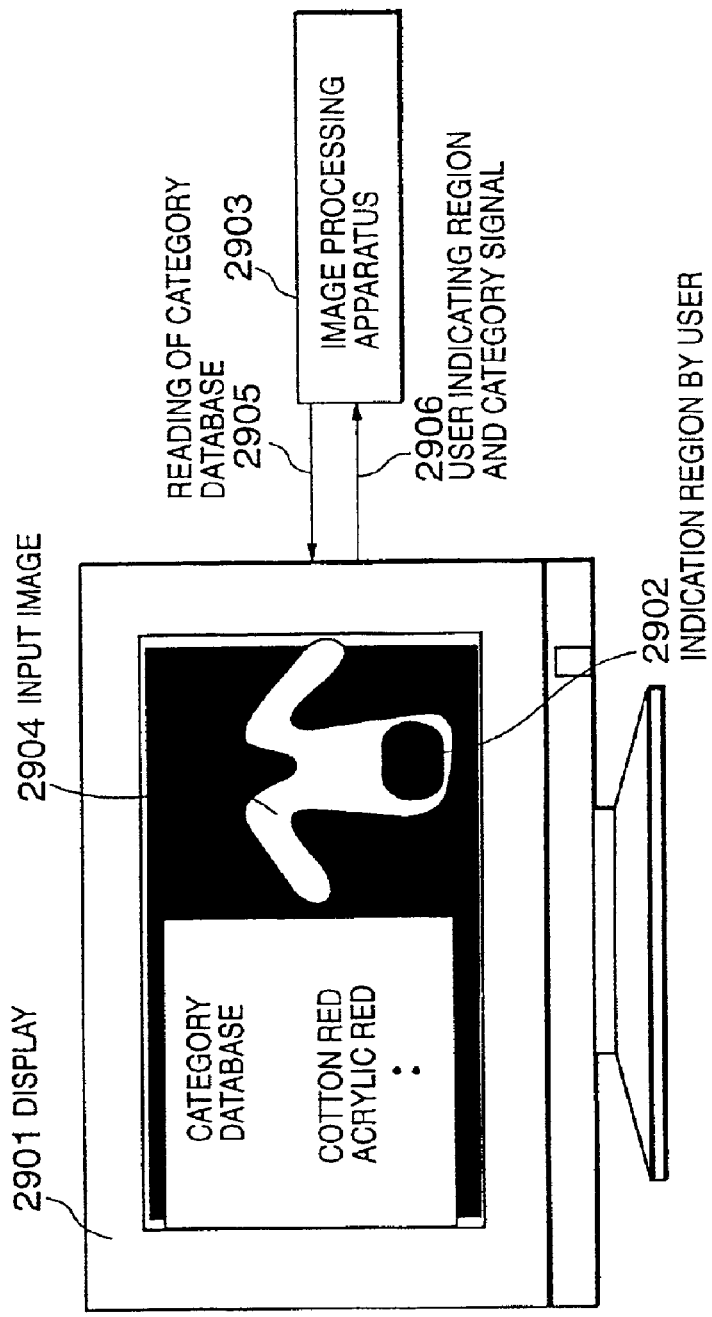
FIG. 29 is a first explanatory view of a user category indicating section 2808 according to the seventh embodiment.

A detailed mode of the user category indicating section 2808 will next be described. FIG. 29 is a first explanatory view of the user category indicating section 2808. The user displays the input image on a display 2901, and encloses a region of the same group in the image with a mouse. Subsequently, the category to be applied to the region is indicated from the prepared categories.

Figure 30:
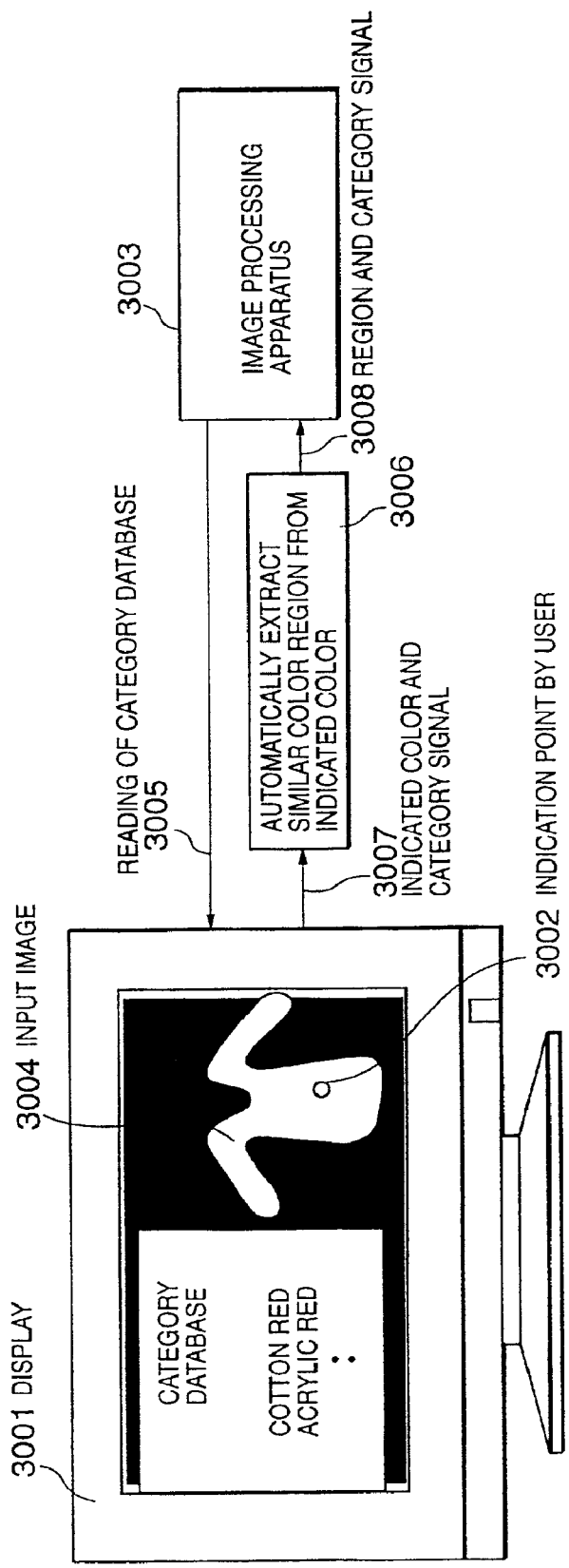
FIG. 30 is a second explanatory view of the user category indicating section 2808 according to the seventh embodiment.
Figure 31:
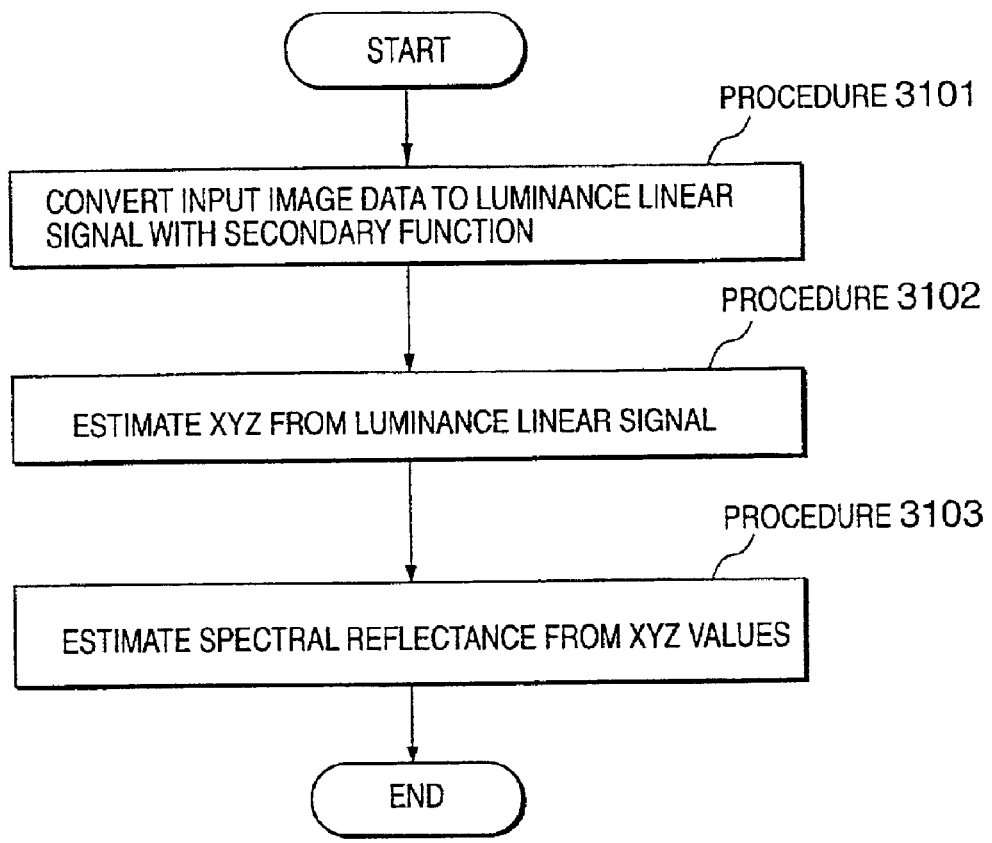
FIG. 31 is a flowchart showing an image processing procedure in a first prior art.
Figure 32:
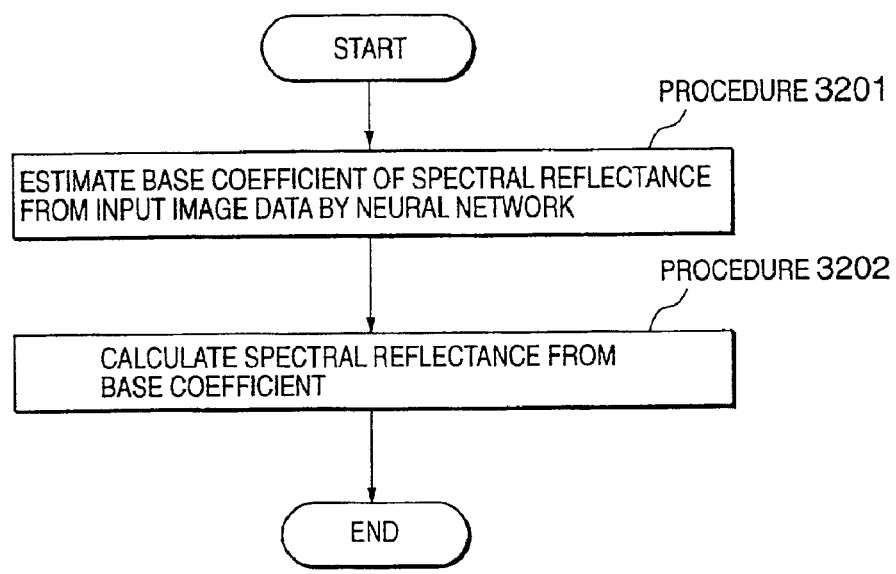
FIG. 32 is a flowchart showing the image processing procedure in a second prior art.

FIG. 30 is a second explanatory view of the user category indicating section 2808. In FIG. 30, the user displays the input image on a display 3001, and clicks the color on the image with the mouse. Subsequently, the category to which the clicked color belongs is indicated. The color similar to the color inputted by the aforementioned operation is assumed to belong to the same category, and the image processing is performed. Additionally, in both of the methods of FIGS. 29, 30, it is judged that the not-indicated pixel does not belong to any category.

As described, according to the present embodiment, a plurality of sets of objects as major constituting elements of the image inputted from the image input apparatus are set, and means for estimating the color data which is not dependent on the apparatus and/or the lighting is calculated for each set, and stored as the database. Subsequently, the user indicates the judgment of the set to which the image data inputted from the image input apparatus belongs, and each set is subjected to the color conversion in the different method. Therefore, the category judgment is securely performed, and high-precision color conversion can be performed.

As described above, according to the present invention, there can be an image processing method and image processing apparatus for highly precisely converting the color image data inputted from the image input apparatus to the color space which is not dependent on the apparatus and/or the lighting.

What is claimed is:

1. An image processing apparatus comprising:
    color category classifying means for classifying each image signal inputted from an image input apparatus into one of categories to which said image signal belongs, each of said categories including colors having similar statistical characteristics;
    color conversion processing selecting means for selecting a color conversion processing which differs with each of said color categories using predetermined statistical characteristics; and
    color conversion processing means for converting a color of a noted pixel by the color conversion processing selected by said color conversion processing selecting means.

2. An image processing method comprising:
    a step of learning data constituted of a specified subject for each of color categories beforehand, each of said categories including colors having similar statistical characteristics;
    a step of judging the learned color category to which a color of each pixel of an inputted image signal belongs; and
    a step of subjecting said each color category to a different color conversion processing using predetermined statistical characteristics.

3. The image processing method according to claim 2 wherein said color conversion processing comprises a step of converting said inputted image signal to the color data which is not dependent on an image input apparatus and/or lighting.

4. The image processing method according to claim 2 wherein said color conversion processing comprises a step of converting color data in a method using a statistical property of said each color category, when the color of each pixel of said inputted image signal belongs to any one of said color categories.

5. The image processing method according to claim 4 wherein a multiple regression analysis is used in the conversion to said color data using the statistical property of said each color category.

6. The image processing method according to claim 4 wherein a neural network is used in the conversion to said color data using the statistical property of said each color category.

7. The image processing method according to claim 2, further comprising a step of judging the color category to which the color of said each pixel belongs by agreement to a statistical property of said each color category.

8. The image processing method according to claim 7 wherein said statistical property is an average value.

9. The image processing method according to claim 7 wherein said statistical property is a Mahalanobis distance.

10. The image processing method according to claim 2, further comprising a step of judging the color category to which the color of said each pixel belongs by a neural network.

11. An image processing method comprising:
a step of learning data constituted of a specified subject for each set beforehand;
a step of judging the learned set to which a color of each pixel of an inputted image signal belongs; and
a step of subjecting said each set to a different color conversion processing, wherein
said color conversion processing comprises a step of: weighting color data calculated using the statistical property of said set, and color data calculated using the statistical property of a broad range of set in accordance with reliability with which the color belongs to said set, and converting the color data, when the color of each pixel of said inputted image signal belongs to any one of said sets.

12. An image processing method comprising:
a step of learning data constituted of a specified subject for each set beforehand;
a step of subjecting of the learned set to which a color of each pixel of an inputted image signal belongs;
a step of subjecting said each set to a different color conversion processing; and
a step of judging the set to which the color of said each pixel belongs by a difference between color data obtained supposing that the color belongs to the set or a region and not dependent on an apparatus and/or lighting, and color data obtained supposing that the color does not belong to any set or region and not dependent on the apparatus and/or the lighting.

13. An image processing method comprising:
a step of learning data constituted of a specified subject for each set beforehand;
a step of judging the learned set to which a color of each pixel of an inputted image signal belongs;
a step of subjecting said each set to a different color conversion processing; and a step of judging peculiar data deviating from the set from a statistical property of said each set in said each set, and using an appropriate set from which said peculiar data is removed.

14. An image processing method comprising:
a step of learning data constituted of a specified subject for each set beforehand;
a step of judging the learned set to which a color of each pixel of an inputted image signal belongs;
a step of subjecting said each set to a different color conversion processing; and
a step of calculating separatability between said sets from a statistical property of said each set, and using the set which is high in said separatability.

15. The image processing method according to claim 14 wherein said separatability is an independence of a partial space constituted of said each set in an image data space.

16. The image processing method according to claim 14 wherein said separatability is the independence of the partial space constituted of said each set in a color space which is not dependent on an apparatus and/or lighting.

17. An image processing method comprising:
a step of learning a distribution of a specified object in a color space after color conversion for each of color categories during the color conversion of an image, each of said categories including colors having similar statistical characteristics;
a step of performing tentative color conversion from an inputted image signal;
a step of using the signal after said tentative color conversion to judge the color category to which color belongs in the color space after the color conversion; and
a step of subjecting said judged each color category to a different color conversion processing.

18. The image processing method according to claim 17 wherein said color conversion processing comprises a step of convening said inputted image signal to color data which is not dependent on an image input apparatus and/or lighting.

19. The image processing method according to claim 17 wherein said color conversion processing comprises conversion to a spectral reflectance.

20. The image processing method according to claim 17 wherein said color conversion processing comprises conversion to XYZ three stimulus values.

21. The image processing method according to claim 17 wherein said color conversion processing comprises the color conversion by a method using a statistical property of said each color category, when the color of each pixel of said inputted image signal belongs to any one of said color categories.

22. The image processing method according to claim 21 wherein a multiple regression analysis is used in the color conversion using the statistical property of said each color category.

23. The image processing method according to claim 21 wherein a neural network is used in the color conversion using the statistical property of said each color category.

24. The image processing method according to claim 17, further comprising a step of judging the color category to which the color of said each pixel belongs by agreement to a statistical property of said each color category in the color space after the conversion.

25. The image processing method according to claim 24 wherein said statistical property is an average value.

26. The image processing method according to claim 24 wherein said statistical property is a Mahalanobis distance.

27. The image processing method according to claim 24 wherein said statistical property is an average value and a Mahalanobis distance.

28. The image processing method according to claim 17, further comprising a step of judging the color category to which the color of said each pixel belongs by a neural network whose input is a value of the color space after the color conversion.

29. The image processing method according to claim 17, further comprising a step of judging the color category to which the color of said each pixel belongs by a user.

30. An image processing method comprising:

a step of learning a distribution of a specified object in a color space after color conversion for each set during the color conversion of an image;

a step of performing tentative color conversion from an inputted image signal;

a step of using the signal after said tentative color conversion to judge the set to which color belongs in the color space after the color conversion; and a step of subjecting said judged each set to a different color conversion processing, wherein the step of judging the set to which the color of each pixel of said inputted image signal belongs comprises a step of tentatively estimating a base coefficient of a spectral reflectance from the color of said each pixel, and judging the set in a base coefficient space, when said color conversion processing comprises conversion to the spectral reflectance.

31. An image processing method comprising:

a step of learning a distribution of a specified object in a color space after color conversion for each set during the color conversion of an image;

a step of performing tentative color conversion from an inputted image signal;

a step of using the signal after said tentative color conversion to judge the set to which color belongs in the color space after the color conversion; and a step of subjecting said judged each set to a different color conversion processing, wherein said color conversion processing comprises the color conversion by a method using a statistical property of said each set when the color of each pixel of said inputted image signal belongs to any one of said sets, and by a method using the statistical property of a broad range of set when the color does not belong to any set.

32. An image processing method comprising:

a step of learning a distribution of a specified object in a color space after color conversion for each set during the color conversion of an image;

a step of performing tentative color conversion from an inputted image signal;

a step of using the signal after said tentative color conversion to judge the set to which color belongs in the color space after the color conversion; and a step of subjecting said judged each set to a different color conversion processing, wherein said color conversion processing comprises a step of converting color data calculated using a statistical property of said set, and color data judged to he statistically non-correlated and calculated to the color data weighted in accordance with reliability with which the color belongs to said set, when the color of each pixel of said inputted image signal belongs to any one of said sets.

33. An image processing method comprising:

a step of learning a distribution of a specified object in a color space after color conversion for each set during the color conversion of an image;

a step of performing tentative color conversion from an inputted image signal;

a step of using the signal after said tentative color conversion to judge the set to which color belongs in the color space after the color conversion; and a step of subjecting said judged each set to a different color conversion processing, wherein said color conversion processing comprises a step of converting color data calculated using a statistical property of said set, and color data calculated by a method using the statistical property of a broad range of set to the color data weighted in accordance with reliability with which the color belongs to said set, when the color of each pixel of said inputted image signal belongs to any one of said sets.

* * * * *

UNITED STATES PATENT AND TRADEMARK OFFICE
CERTIFICATE OF CORRECTION

PATENT NO. : 6,888,963 B2
DATED : May 3, 2005
INVENTOR(S) : Mutsuko Nichogi

It is certified that error appears in the above-identified patent and that said Letters Patent is hereby corrected as shown below:

<u>Column 39,</u>
Lines 48-49, change "a step of subjecting of the learned set to which a color of each pixel of an inputted image signal belongs" to -- a step of judging the learned set to which a color of each pixel of an inputted image signal belongs --.

Signed and Sealed this

Thirtieth Day of August, 2005

JON W. DUDAS
*Director of the United States Patent and Trademark Office*